United States Patent
Ashton Vital Brazil et al.

(10) Patent No.: US 11,989,628 B2
(45) Date of Patent: May 21, 2024

(54) MACHINE TEACHING COMPLEX CONCEPTS ASSISTED BY COMPUTER VISION AND KNOWLEDGE REASONING

(71) Applicants: International Business Machines Corporation, Armonk, NY (US); Petrogal Brasil S.A., Rio de Janeiro (BR)

(72) Inventors: Emilio Ashton Vital Brazil, Rio de Janeiro (BR); Rodrigo da Silva Ferreira, Rio de Janeiro (BR); Viviane Torres da Silva, Laranjeiras (BR); Renato Fontoura de Gusmao Cerqueira, Rio de Janeiro (BR); Raphael Melo Thiago, Rio de Janeiro (BR); Elton Figueiredo de Souza Soares, Rio de Janeiro (BR); Leonardo Guerreiro Azevedo, Rio de Janeiro (BR); Vinicius Costa Villas Boas Segura, Rio de Janeiro (BR); Ana Fucs, Rio de Janeiro (BR); Juliana Jansen Ferreira, Rio de Janeiro (BR); Joana de Noronha Ribeiro de Almeida, Lisbon (PT); Bruno Felix Carvalho, Lisbon (PT); Dario Sergio Cersosimo, Lisbon (PT); Marco Daniel Melo Ferraz, Oeiras (PT)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 17/193,697

(22) Filed: Mar. 5, 2021

(65) Prior Publication Data

US 2022/0284343 A1 Sep. 8, 2022

(51) Int. Cl.
*G06T 7/11* (2017.01)
*G06F 18/21* (2023.01)
(Continued)

(52) U.S. Cl.
CPC .......... *G06N 20/00* (2019.01); *G06F 18/2178* (2023.01); *G06F 18/22* (2023.01); *G06N 5/04* (2013.01); *G06T 7/11* (2017.01)

(58) Field of Classification Search
CPC ..................................................... G06N 20/00
See application file for complete search history.

(56) References Cited

U.S. PATENT DOCUMENTS 6,038,560 A    3/2000 Wical
7,162,463 B1   1/2007 Wentland et al.
(Continued)

FOREIGN PATENT DOCUMENTS

CN    101799835 B    8/2010
CN    102918423 A    2/2013
(Continued)

OTHER PUBLICATIONS

NIST, "NIST Cloud Computing Program", http://csrc.nist.gov/groups/SNS/cloud-computing/index.html, Created Dec. 1, 2016, Updated Oct. 6, 2017, 9 pages.
(Continued)

*Primary Examiner* — Oneal R Mistry
(74) *Attorney, Agent, or Firm* — Scully, Scott, Murphy & Presser, P.C.; Jared Chaney

(57) ABSTRACT

Machine teaching in an embodiment can include receiving a user annotated concept for a given image in given context. The given image can be broken into parts and classified. Relationships can be determined associated with the parts. The created relationships can be stored along with the user annotated concept in a knowledge base. One or more similar (Continued)

images can be annotated using the parts and relationships. A second image associated the given context can be retrieved, decomposed into parts. The parts can be classified. Relationships can be determined associated with the second image's parts. Classifications and relationships associated with the second image's parts can be compared with classifications and relationships associated with the given image's parts. Based on comparing, the second image can be annotated with the user annotated concept for the given image.

19 Claims, 18 Drawing Sheets

(51) Int. Cl.
*G06F 18/22* (2023.01)
*G06N 5/04* (2023.01)
*G06N 20/00* (2019.01)

(56) References Cited

U.S. PATENT DOCUMENTS

| | | | |
|---|---|---|---|
| 7,249,116 B2 | 7/2007 | Fiske | |
| 7,917,492 B2 | 3/2011 | Bargeron et al. | |
| 9,194,968 B2 | 11/2015 | Imhof et al. | |
| 11,450,435 B2 * | 9/2022 | Junio | G16H 30/40 |
| 11,537,506 B1 * | 12/2022 | Dasgupta | G06F 11/1476 |
| 11,556,746 B1 * | 1/2023 | Dasgupta | G06N 5/04 |
| 11,861,833 B2 * | 1/2024 | Min | G06F 18/10 |
| 2008/0027917 A1 | 1/2008 | Mukherjee et al. | |
| 2009/0119281 A1 | 5/2009 | Wang et al. | |
| 2012/0191716 A1 | 7/2012 | Omoigui | |
| 2015/0254567 A1 | 9/2015 | Imhof | |
| 2017/0103264 A1 * | 4/2017 | Javan Roshtkhari | G06V 20/49 |
| 2018/0032839 A1 | 2/2018 | Binotto et al. | |
| 2020/0143207 A1 | 5/2020 | Greenberg | |
| 2020/0302232 A1 * | 9/2020 | Kilickaya | G06V 10/273 |
| 2021/0174504 A1 * | 6/2021 | Madabhushi | G16H 30/40 |
| 2022/0147760 A1 * | 5/2022 | Dutta | G06F 18/23211 |
| 2022/0222917 A1 * | 7/2022 | Oosawa | G06T 7/0014 |
| 2022/0237414 A1 * | 7/2022 | Zhang | A01M 21/00 |
| 2023/0274428 A1 * | 8/2023 | Fujii | G06T 7/0012 382/129 |

FOREIGN PATENT DOCUMENTS

| | | |
|---|---|---|
| CN | 103324940 A | 9/2013 |
| CN | 105787472 B | 7/2016 |
| CN | 106355627 A | 1/2017 |
| CN | 107553490 A | 1/2018 |
| CN | 110851422 A | 2/2020 |
| CN | 111221962 A | 6/2020 |

OTHER PUBLICATIONS

Wiegand, N., et al., "A Task-Based Ontology Approach to Automate Geospatial Data Retrieval", Transactions in GIS, 2007, pp. 355-376, 11(3).

Baltsavias, E. P., "Object extraction and revision by image analysis using existing geodata and knowledge: current status and steps towards operational systems", ISPRS Journal of Photogrammetry and Remote Sensing 58, Received Jan. 31, 2003, accepted Sep. 26, 2003, pp. 129-151.

Maillot, N., et al., "Towards ontology-based cognitive vision", Machine Vision and Applications (2004), Published online Jun. 8, 2004, pp. 33-40.

Fu, H., et al., "Machine Learning Techniques for Ontology-based Leaf Classification", 2004 8th International Conference on Control, Automation, Robotics and Vision, Dec. 6-9, 2004, pp. 681-686.

Hudelot, C., et al., "Symbol Grounding for Semantic Image Interpretation: from Image Data to Semantics", Tenth IEEE International Conference on Computer Vision, Nov. 2005, 8 pages.

Gupta, U., et al., Deep Transfer Learning with Ontology for Image Classification, 2015 Fifth National Conference on Computer Vision, Pattern Recognition, Image Processing and Graphics (NCVPRIPG), Dec. 2015, 4 pages.

Muller, H., et al., "A review of content-based image retrieval systems in medical applications-clinical benefits and future directions", International Journal of Medical Informatics (2004), Received Jul. 22, 2003, accepted Nov. 13, 2003, pp. 1-23.

Lowe, H. J., et al., "Towards Knowledge-Based Retrieval of Medical Images. The Role of Semantic Indexing, Image Content Representation and Knowledge-Based Retrieval.", AMIA, 1998, pp. 882-886.

Dori, D., "Cognitive Image Retrieval", In Proceedings 15th International Conference on Pattern Recognition, Sep. 2000, pp. 42-45.

Wang, J.Z., et al., "SIMPLIcity: Semantics-Sensitive Integrated Matching for Picture Libraries", IEEE Transactions on Pattern Analysis and Machine Intelligence, Sep. 2001, pp. 947-963, vol. 23, No. 9.

Mojsilovic, A., et al., "Semantic based categorization, browsing and retrieval in medical image databases", Sep. 2002, 4 pages.

Branson, S., et al., "Visual Recognition with Humans in the Loop", ECCV 2010, Part IV, LNCS 6314, Sep. 2010, pp. 438-451.

Misra, A., et al., "Impact of Quasi-expertise on Knowledge Acquisition in Computer Vision", 24th International Conference Image and Vision Computing New Zealand (IVCNZ 2009), pp. 334-339.

* cited by examiner

Chaotic Salt

Chaotic and Stratified Salt

MACHINE TEACHING COMPLEX CONCEPTS ASSISTED BY COMPUTER VISION AND KNOWLEDGE REASONING

BACKGROUND

The present application relates generally to computers and computer applications, and more particularly to machine teaching, machine learning and augmented machine learning.

Machine learning uses data to train a machine to autonomously perform predications and/or classification, and for example, to act on the prediction or recommend an action based on the prediction. For instance, in supervised learning, training data is labeled so the machine learning algorithm can learn from the labeled data to be able to predict on unseen unlabeled data. However, it is not always the case that enough labeled training data can be made available readily. The process of labeling the data can also become a laborious or resource intensive task.

Some machine learning can be augmented with knowledge base. However, again, building the knowledge base, for example, with expert's knowledge in a domain, can be difficult and time consuming. For instance, while ontologies exist, in applications such as domain-specific applications, it can be difficult to create domain specific ontologies describing relevant concepts and their relationships, for example, many structures, variability, new structures. In another aspect, it may not be possible to define beforehand all possible concepts used to annotate a specific domain. In turn, lack of such data can make it difficult to train a generalizable machine learning algorithm.

BRIEF SUMMARY

The summary of the disclosure is given to aid understanding of a computer system, computer architectural structure, processor, performing machine teaching and machine learning, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system, the architectural structure, and/or their method of operation to achieve different effects.

A computer-implemented method can be provided, which can include receiving a user annotated concept for a given image in given context. The method can also include decomposing the given image into parts. The method can further include classifying the parts. The method can also include creating relationships among the parts. The method can also include creating relationships between the parts and the given context. The method can further include storing at least the relationships with the user annotated concept in a knowledge base.

In an aspect, in this way, a machine may automatically and/or autonomously uncover characteristics of a concept, for instance, which may have been possibly hidden or previously unknown. Also based on such characteristics, a machine may automatically and/or autonomously learn to label or annotate other unseen images. In yet another aspect, automatically or autonomously labeled images can be used to train a machine learning model efficiently.

In another aspect, a computer-implemented method can be provided, which can include receiving a user annotated concept for a given image in given context. The method can also include decomposing the given image into parts. The method can further include classifying the parts. The method can also include creating relationships among the parts. The method can also include creating relationships between the parts and the given context. The method can further include storing at least the relationships with the user annotated concept in a knowledge base. The decomposing can be performed by computer vision.

In yet another aspect, a computer-implemented method can be provided, which can include receiving a user annotated concept for a given image in given context. The method can also include decomposing the given image into parts. The method can further include classifying the parts. The method can also include creating relationships among the parts. The method can also include creating relationships between the parts and the given context. The method can further include storing at least the relationships with the user annotated concept in a knowledge base. The classifying is performed by a machine learning model trained to classify images.

In still another aspect, a computer-implemented method can be provided, which can include receiving a user annotated concept for a given image in given context. The method can also include decomposing the given image into parts. The method can further include classifying the parts. The method can also include creating relationships among the parts. The method can also include creating relationships between the parts and the given context. The method can further include storing at least the relationships with the user annotated concept in a knowledge base. Unsupervised machine learning can partition the given image into parts.

In another aspect, a computer-implemented method can be provided, which can include receiving a user annotated concept for a given image in given context. The method can also include decomposing the given image into parts. The method can further include classifying the parts. The method can also include creating relationships among the parts. The method can also include creating relationships between the parts and the given context. The method can further include storing at least the relationships with the user annotated concept in a knowledge base. The method can further include retrieving a second image associated the given context. The method can also include decomposing the second image into parts. The method can further include classifying the second image's parts. The method can also include determining relationships among the second image's parts. The method can also include determining relationships between the second image's parts and the given context. The method can further include comparing classifications of the second image's parts, the relationships among the second image's parts and between the second image's parts and the given context, with classifications of the given image's parts, the relationships among the given image's parts and between the given image's parts and the given context. The method can also include, based on the comparing, annotating the second image with the user annotated concept for the given image.

In yet another aspect, a computer-implemented method can be provided, which can include receiving a user annotated concept for a given image in given context. The method can also include decomposing the given image into parts. The method can further include classifying the parts. The method can also include creating relationships among the parts. The method can also include creating relationships between the parts and the given context. The method can further include storing at least the relationships with the user annotated concept in a knowledge base. The method can further include retrieving a second image associated the given context. The method can also include decomposing the second image into parts. The method can further include classifying the second image's parts. The method can also include determining relationships among the second image's parts. The method can also include determining relationships between the second image's parts and the given context. The method can further include comparing classifications of the second image's parts, the relationships among the second image's parts and between the second image's parts and the given context, with classifications of the given image's parts, the relationships among the given image's parts and between the given image's parts and the given context. The method can also include, based on the comparing, annotating the second image with the user annotated concept for the given image. The second image can be retrieved based on similarity with the given image, the similarity determined according to a similarity threshold.

In still another aspect, a computer-implemented method can be provided, which can include receiving a user annotated concept for a given image in given context. The method can also include decomposing the given image into parts. The method can further include classifying the parts. The method can also include creating relationships among the parts. The method can also include creating relationships between the parts and the given context. The method can further include storing at least the relationships with the user annotated concept in a knowledge base. The method can further include retrieving a second image associated the given context. The method can also include decomposing the second image into parts. The method can further include classifying the second image's parts. The method can also include determining relationships among the second image's parts. The method can also include determining relationships between the second image's parts and the given context. The method can further include comparing classifications of the second image's parts, the relationships among the second image's parts and between the second image's parts and the given context, with classifications of the given image's parts, the relationships among the given image's parts and between the given image's parts and the given context. The method can also include, based on the comparing, annotating the second image with the user annotated concept for the given image. The second image can be annotated with the user annotated concept for the given image responsive to determining that the created relationships associated with the given image and the determined relationships associated with the second image are similar based on a similarity threshold.

In another aspect, a computer-implemented method can be provided, which can include receiving a user annotated concept for a given image in given context. The method can also include decomposing the given image into parts. The method can further include classifying the parts. The method can also include creating relationships among the parts. The method can also include creating relationships between the parts and the given context. The method can further include storing at least the relationships with the user annotated concept in a knowledge base. The method can further include retrieving a second image associated the given context. The method can also include decomposing the second image into parts. The method can further include classifying the second image's parts. The method can also include determining relationships among the second image's parts. The method can also include determining relationships between the second image's parts and the given context. The method can further include comparing classifications of the second image's parts, the relationships among the second image's parts and between the second image's parts and the given context, with classifications of the given image's parts, the relationships among the given image's parts and between the given image's parts and the given context. The method can also include, based on the comparing, annotating the second image with the user annotated concept for the given image. The method can also include storing at least the second image's relationships with the user annotated concept for the given image in the knowledge base.

In another aspect, a computer-implemented method can be provided, which can include receiving a user annotated concept for a given image in given context. The method can also include decomposing the given image into parts. The method can further include classifying the parts. The method can also include creating relationships among the parts. The method can also include creating relationships between the parts and the given context. The method can further include storing at least the relationships with the user annotated concept in a knowledge base. The method can further include retrieving a second image associated the given context. The method can also include decomposing the second image into parts. The method can further include classifying the second image's parts. The method can also include determining relationships among the second image's parts. The method can also include determining relationships between the second image's parts and the given context. The method can further include comparing classifications of the second image's parts, the relationships among the second image's parts and between the second image's parts and the given context, with classifications of the given image's parts, the relationships among the given image's parts and between the given image's parts and the given context. The method can also include, based on the comparing, annotating the second image with the user annotated concept for the given image. The method can further include validating with a user whether the second image is to be annotated with the user annotated concept for the given image, and storing at least the second image's relationships with the user annotated concept for the given image in the knowledge base responsive to the user's validation.

In another aspect, a computer-implemented method can be provided, which can include receiving a user annotated concept for a given image in given context. The method can also include decomposing the given image into parts. The method can further include classifying the parts. The method can also include creating relationships among the parts. The method can also include creating relationships between the parts and the given context. The method can further include storing at least the relationships with the user annotated concept in a knowledge base. The method can further include retrieving a second image associated the given context. The method can also include decomposing the second image into parts. The method can further include classifying the second image's parts. The method can also include determining relationships among the second image's parts. The method can also include determining relationships between the second image's parts and the given context. The method can further include comparing classifications of the second image's parts, the relationships among the second image's parts and between the second image's parts and the given context, with classifications of the given image's parts, the relationships among the given image's parts and between the given image's parts and the given context. The method can also include, based on the comparing, annotating the second image with the user annotated concept for the given image. The method can also include storing at least the second image's relationships with the user annotated concept for the given image in the knowledge base. The knowledge base can be used to train a machine learning model to learn to identify concepts in images autonomously.

In still another aspect, a computer-implemented method can be provided, which can include receiving a user annotated concept for a given image in given context. The method can also include decomposing the given image into parts. The method can further include classifying the parts. The method can also include creating relationships among the parts. The method can also include creating relationships between the parts and the given context. The method can further include storing at least the relationships with the user annotated concept in a knowledge base. The given context can include geology.

In another aspect, a computer-implemented method can be provided, which can include receiving a user annotated concept for a given image in given context. The method can also include decomposing the given image into parts. The method can further include classifying the parts. The method can also include creating relationships among the parts. The method can also include creating relationships between the parts and the given context. The method can further include storing at least the relationships with the user annotated concept in a knowledge base. The given context can include medical imaging.

A system including at least one hardware processor configured to perform one or more methods described herein may also be provided. A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
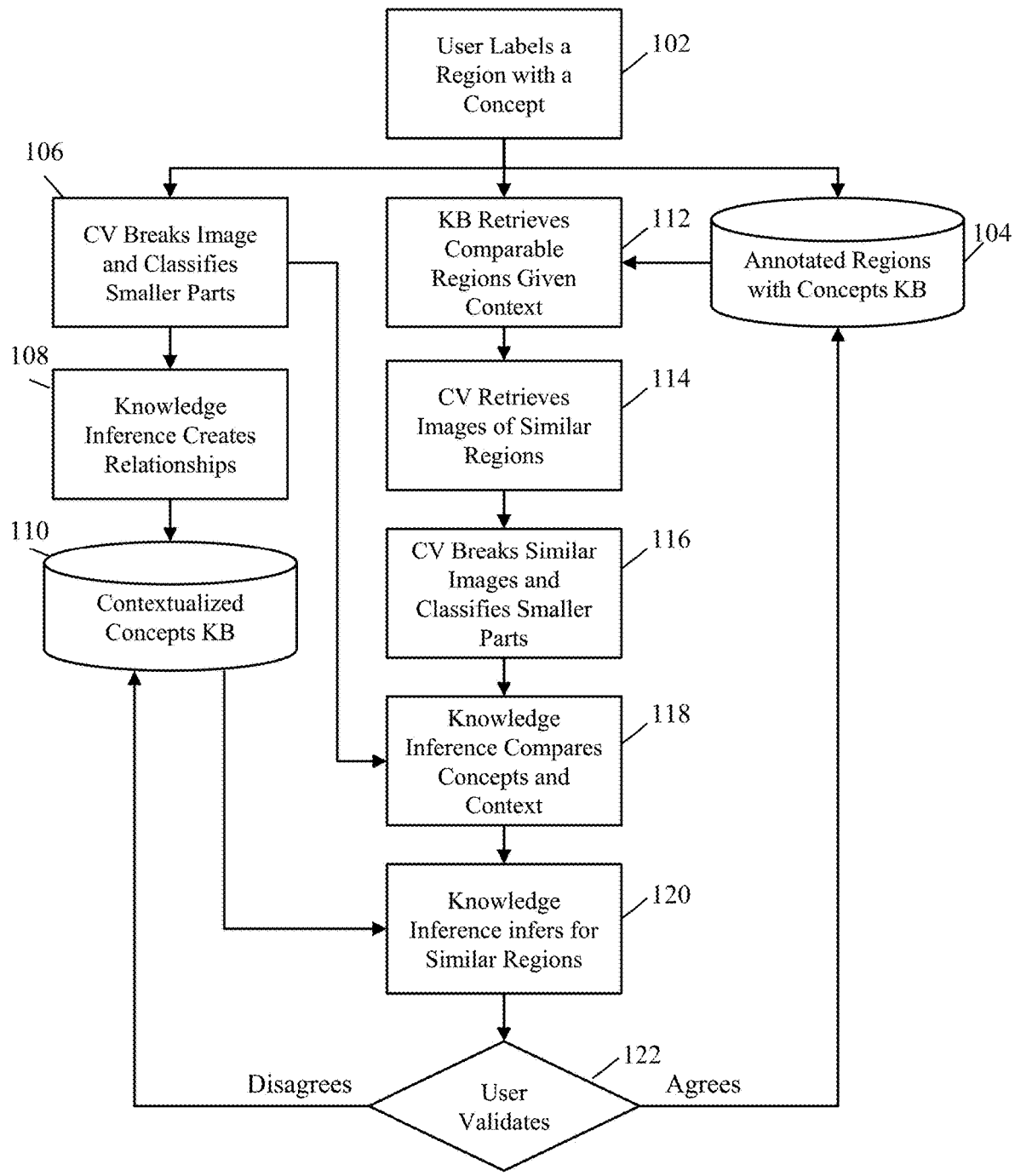
FIG. 1 is a diagram illustrating a method of machine teaching in an embodiment.

In one or more embodiments, systems, methods and techniques can be provided, which can automatically retrieve and label concepts within regions of interest in image data. The systems, methods and/or techniques can be assisted by context information, and allow for knowledge expansion, for example, for machine learning or machine training. For instance, a generalizable machine learning algorithm able to automatically annotate regions can be trained and provided.

In an aspect, systems, methods and techniques provide advantages of allowing machine learning without needing a large training dataset and allowing machines to learn quickly (e.g., training time is minimized). For example, machines can learn to make forecasts or predictions more accurately in less amount of time, e.g., with less amount of training data. Such advantage also allows for reduction in use of computer resources such as processor time, memory space, for example, as less data can be processed. In a further aspect, knowledge base can be automatically expanded with learned data, for example, including new and evolving data, and the knowledge can be transferred for use in identifying or annotating other images. The knowledge that is kept in the knowledge base can be dynamic and evolving information that is kept up-to-date with new information.

In an aspect, experts implicitly annotate regions of interest when making interpretations. In an embodiment, a knowledge base can infer and store new concepts and relationships based on implicit annotations. Knowledge base for example can store structured and/or unstructured information, for example, and relationships among the information. In an embodiment, knowledge base can have a graph data structure, for example a knowledge graph with nodes and edges connecting the nodes. Knowledge base can have, or be implemented, as other data structures, for example, for computer consumption. Computer vision (CV) includes algorithms or techniques that identify and process objects in images and videos. For example, computer vision trains computers to interpret and understand the image such as digital image and/or video content. Computer vision can include techniques such as machine learning and/or use of machine learning models such as deep learning models to accurately identify and/or classify objects, and possibly react to what it identifies. In an embodiment, one or more computer vision algorithms can break or decompose the original region (images of) into smaller parts, classifying the smaller parts with simpler concepts. One or more computer vision algorithms can also retrieve or receive similar images. In an embodiment, one or more knowledge augmented machine learning algorithms can automatically annotate regions. In an embodiment, acquired knowledge about concepts can be used to search for candidate regions to be annotated.

Knowledge expansion, in an embodiment, can include a computer vision algorithm or the like decomposing or breaking up an image into parts and classifying the parts with image concepts, for example, simpler concepts (referred to as a simple concept) than a concept associated with the whole of the image that included the parts (e.g., referred to as a complex concept). A complex concept can be broken down into a plurality of simple concepts. For instance, a complex concept can be a concept that can be broken down into multiple concepts (referred to as simple concepts). Knowledge expansion, in an embodiment, can also include a knowledge base using the relationships between parts (e.g., on top of, younger than, etc.), the concepts (both simple and complex), and the context of the image, to expand the knowledge base's knowledge and infer new relationships.

Knowledge transfer, in an embodiment, can include a computer vision algorithm or the like using an image similarity algorithm or the like to retrieve similar regions which are similar to the image and classifying the similar regions with simple image concepts. Knowledge transfer, in an embodiment, can also include the knowledge base inferring from simple concepts, complex concepts and contextual information associated with the similar regions, to apply or infer complex concepts to similar images.

In one or more embodiments, systems and methods can automatically expand the knowledge base and transfer knowledge to other entities such as but not limited to, geological structures and medical image regions, for example, based on interpreter's daily or periodic work. A system, for example, can capture the experts' hierarchical knowledge about complex structures—e.g., geological structures composed of many simple parts—integrated with their daily (e.g., periodic, regular or routine) activities. The system may employ a method that breaks an image, for example, by unsupervised machine learning method and combines these parts or segments to compose one or more complex structures. The system, for example, may employ a method that combines one or more image retrieval and/or classification computer vision algorithms and a knowledge base to create a relationship between simple image concepts and contextual information to infer new complex concepts. In an embodiment, machine teaching can be presented as a mechanism to enrich and expand a knowledge base with new complex concepts and relationships supported by one or more computer vision algorithms to automatically classify parts with learned simple concepts.

A system in an embodiment can include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

FIG. 1 is a diagram illustrating a method of machine teaching in an embodiment. The method can be implemented or run on one or more computer processors, for example, hardware processors. At 102, a user such a domain expert may label an image of a region with a domain concept, for example, a complex domain concept. A complex concept or complex domain concept refers to a concept that can be broken down or decomposed into multiple concepts, for example, which in an aspect may be considered simpler, and where the multiple concepts together may make up the complex concept.

For example, on a computer-implemented user interface, a user may be presented with an image or a region of an image. The user may select the region or the region may be selected automatically by a computer process. The region selection may be done using one or more different techniques such as drawing over a reference image, searching for regions from a knowledge base, using the result of some operation such as merge, intersection, and/or others.

The labeling may use a concept that is already available in the knowledge base or introduce a new concept that can be added to the knowledge base. For instance, a user may also be presented with a menu or list of possible labels to use or select to label the region. Such menu or list of possible labels can be retrieved from the knowledge base, for example, which stores labels. The user interface may also allow the user to enter a label in free form, for example, a new label not already on the menu or list.

At 104, annotated regions with complex domain concepts are stored in and/or retrieved from the knowledge base. For example, the knowledge base shown at 104 stores annotated regions with complex domain concepts. Regions and their concepts can also be retrieved from the knowledge base at 104. The knowledge base, for example, can include data (e.g., images, regions of images, and associated concepts) in any format, for example, as a database, as a knowledge graph with nodes and edges, and/or in another format. A storage device or a memory device can store such data.

At 106, a technique such as a computer vision algorithm breaks the image that is labeled at 102 into parts and classifies the smaller parts with image concepts, for example, simple image concepts. These simple image concepts or simple concepts can be one of the concepts that make up the complex concept, for example, labeled at 102.

For example, for the partition of the image, one or more classic algorithms such as image segmentation and/or one or more clustering algorithms such as K-means, hierarchical, spectral, or another, can be used. Any other algorithms, for example, unsupervised machine learning algorithms, can be used. For the small parts classification, for example, to classify the partitioned or segmented images, the method in an embodiment can use a rule-based classification, e.g., which uses domain knowledge to set the classification rules, and/or one or more supervised classification algorithms (e.g., Support Vector Machine, Random Forest, Neural Network, other deep learning, and/or others) trained to predict simple concepts. For instance, it can be significantly simpler to train a classification algorithm for simple concepts in terms of training data demand and training time than for complex ones.

At 108, knowledge inference creates relationships between the smaller parts, their simple image concepts, and the context. Here, the knowledge base may learn or infer new concepts and/or relationships by analyzing the output of step 106. For instance, "concept A always appears above/below/beside concept B", or yet "in basin A (geological context), concepts C and D have always a different relationship than the one they present in basin B". In an embodiment, the consolidation of these rules can be done by one or more statistical approaches and/or rule-based machine learning.

At 110, a contextualized concepts knowledge base stores the simple and complex concepts, and their relationships in the given geological context (e.g., up to that point). Such data can also be retrieved from the contextualized concepts knowledge base. For example, the contextualized concepts knowledge base stores the thus far learned relationships of simple concepts associated with the segmented images, which form parts of complex concept of the image.

At 112, knowledge base retrieves comparable regions given the context. In an embodiment, given all available regions, the knowledge base uses the initial region context to find only relevant regions, i.e., regions that can be used in comparisons. For instance, in the geological context, regions from different basins may not be comparable.

At 114, a technique such as a computer vision algorithm can be used to retrieve similar regions using image similarity. For example, content-based image retrieval (CBIR) algorithms can be used (e.g., texture-based, colour-based, or shape-based). These algorithms typically provide a similarity score between zero and one, allowing ranking of the similar regions.

At 116, the computer vision algorithm can break or decompose similar images into parts and classify the smaller parts with simple image concepts, for example, as similarly done at 106. By way of example, one or more unsupervised learning or clustering can be used to segment or decompose the similar images into parts. One or more machine learning algorithms, for example, supervised and/or unsupervised (e.g., Convolutional Neural Network, and/or others), can be used to classify the parts.

At 118, knowledge inference compares concepts and context. In an embodiment, based on the simple concepts obtained for the initial region (step 106) and the ones obtained for each similar region (step 116), the system can compare the concepts and their relationships and score the similar regions by their similarity to the initial image in terms of concepts, context, and "structure" (the relationship between the small parts).

At 120, knowledge inference infers complex domain concepts for similar regions. Given the similarity scores obtained in step 118 and the available contextualized concepts knowledge base at 110, a system, for example implementing the method, can infer complex concepts to the similar regions. In an embodiment, a similarity threshold can be configured, and those similarity scores that meet the threshold can be selected to infer complex concepts. In an embodiment, the user can define or configure such similarity threshold, and/or there can be a default similarity threshold that is predefined. In an embodiment, the similar images whose similarity values fall above the threshold the complex concept of the original region can be assigned.

At 122, the user may validate complex domain concepts association with similar regions. The user validates the system's inferences. If the user agrees with the inference, the inferred complex concept is associated with the similar image and saved in the annotated regions knowledge base at 104. If the user disagrees with an inference made by the system, the user can to given the opportunity to inform the correct complex concept, and that information is learned, e.g., stored in the system updating the contextualized concepts knowledge base. For example, simple concepts of the similar image can be associated with the user corrected complex concept, and that information can get stored in the contextualized concepts knowledge base at 110. In an embodiment, once the system is properly trained to classify images or regions of images with correct concepts (e.g., complex concepts), this step at 122 can be omitted or skipped. For example, the system (or a device implementing the method, for instance) can perform an "unsupervised" classification on its own autonomously.

For instance, images that are processed in an embodiment can include digital images or a sequence of digital images, for example, taken by a camera or like device, and/or created by a machine or computer.

Figure 2:
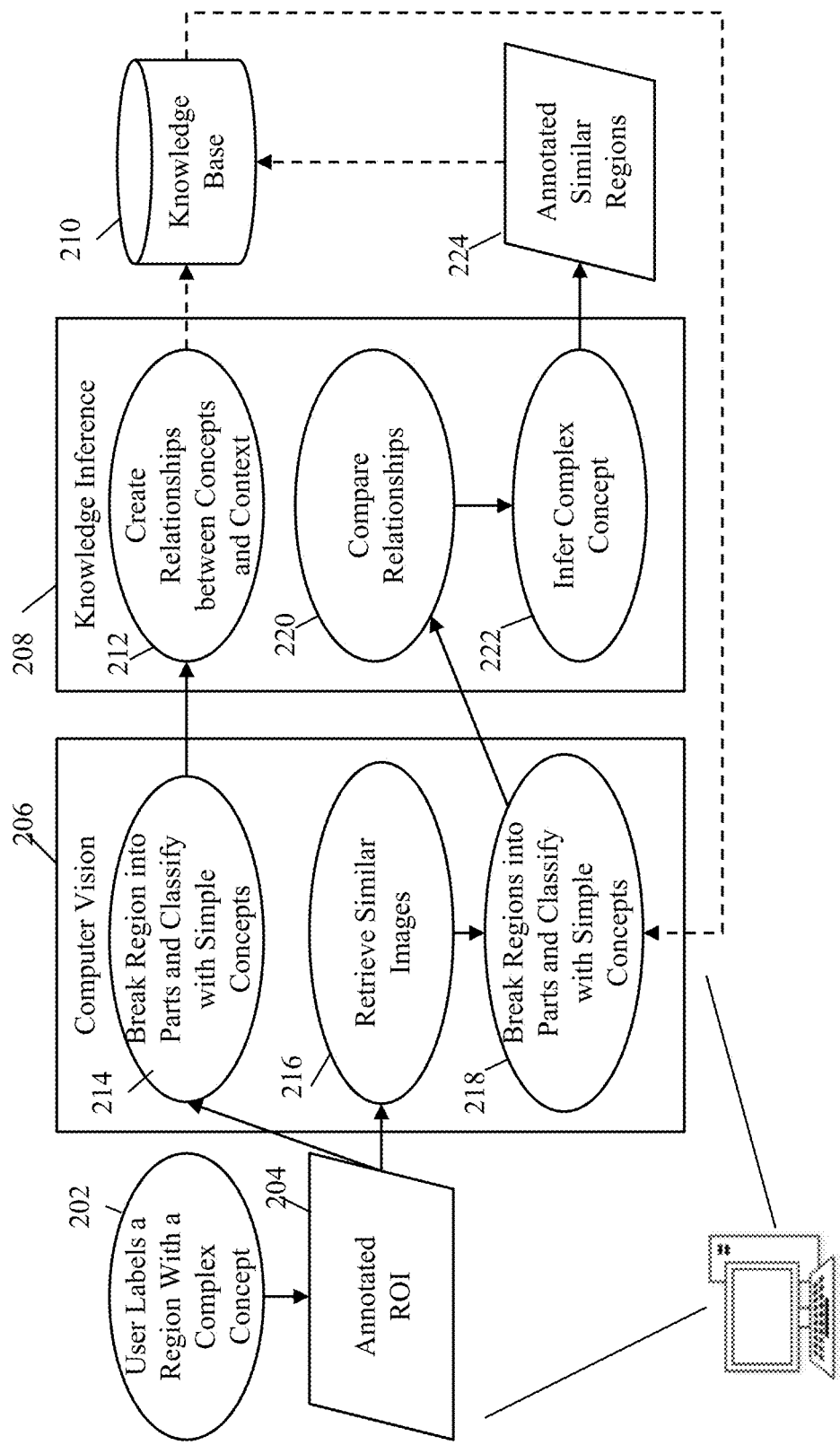
FIG. 2 is a diagram illustrating processing components and/or flow of a system implementing machine teaching in an embodiment.

FIG. 2 is a diagram illustrating processing components and/or flow of a system implementing machine teaching in an embodiment. At 202, a user labels an image or a region in an image with a concept, e.g., complex concept. The image or the region of the image is annotated or associated with the label the user provided, e.g., as shown at 204. There can be a database or knowledge base of annotated images. A computer vision component or processing 206 may break or decompose the user annotated image region into parts and classify each of the parts with a concept. For example, each part can be classified with a simple concept as shown at 214. A knowledge inference process or component 208, for example, using an ontology, may create relationships between the parts' concepts and also the context of the image region, for example, as shown at 212. The parts' concepts, relationships and context can be stored in a knowledge base 210. Briefly, ontology provides information, for example, about concepts, things, for instance, in a domain or subject area, for instance, properties and relationships between them. Ontology can be structured as a graph having nodes and edges, e.g., the nodes representing concepts/things, and edges representing relationships between the nodes the edges connect. In computer processing, ontology can be structured as a graph data structure and/or another data structure. Ontology can be available in many domain areas and provide information about that domain.

The computer vision component or processing 206 may retrieve a similar image as shown at 216, for example, having similar context. The computer vision component or processing 206 may break the similar image into parts and classify the parts into concepts, for example, also referred to as simple concepts as shown at 218. The knowledge inference component or processing 208 as shown at 220 may compare the simple concepts and their relationships in the similar image, to those of an image in the knowledge base 210. If the similar image's simple concepts and their relationships match, for example, based on a similarity threshold, with those of the image in the knowledge base 210, the similar image's complex concept can be inferred, as shown at 222, based on that of the image in the knowledge base 210. For instance, the similar image's complex concept is annotated to be the complex concept of the image in the knowledge base as shown at 224. The similar image, its classified parts and relationships, and e.g., its context, can be stored in the knowledge base 210.

Figure 3A:
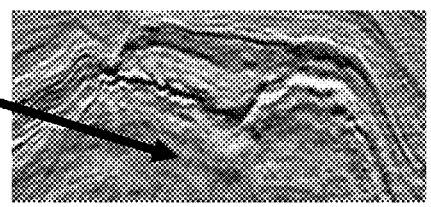
FIG. 3A shows an example of a chaotic salt in geological structure.
Figure 3B:
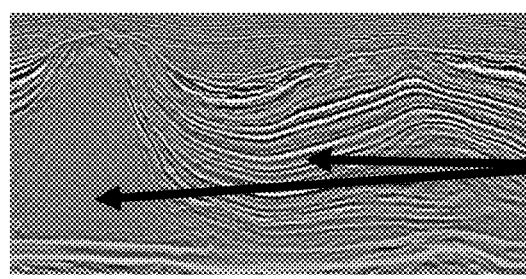
FIG. 3B shows an example of chaotic and stratified salt in geological structure.

As a practical or use case example, an embodiment is described with reference to geology herein. The methodology disclosed herein, however, can be applicable to any other domain. In geology, variability of the relationships between image patterns (e.g., simple concepts) and their geological structures (e.g., complex concepts) is very high. For example, there can be different structures for salt (a complex concept). Even with several experts annotating all available data, it may not be enough to for a machine learning model to readily be able to recognize or classify all variations of salt structure. For example, new structures and new relationships between concepts can be found only in new, not yet available data. By way of example, chaotic salt x stratified salt only found when pre-salt of a particular area was found. FIG. 3A shows an example of a chaotic salt in geological structure. FIG. 3B shows an example of chaotic and stratified salt in geological structure.

FIGS. 4-12 show a process of machine teaching using a practical geology example in an embodiment. A domain expert such as a geologist may delimitate a region of interest (RoI) labeling it with concept (e.g., complex concept), e.g., geological structure such as "salt". A computer vision component can break the RoI into parts classifying those parts with simple concepts, e.g., image patterns such as "chaotic", "bright", and/or others. A knowledge base can create relationships between the parts, their concepts, and the geological context, expanding the knowledge base, e.g., "bright on top of chaotic in Country A Basin."

The system implementing the methodology disclosed herein can scan the entire cube (e.g., image deck of geological structures which can be multi-dimensional, e.g., 3-dimensional) looking for similar images with approximately the same set of simple concepts and relationships, and can label them with the complex concepts (e.g., salt) based on a threshold of similarity identified.

Figure 4:
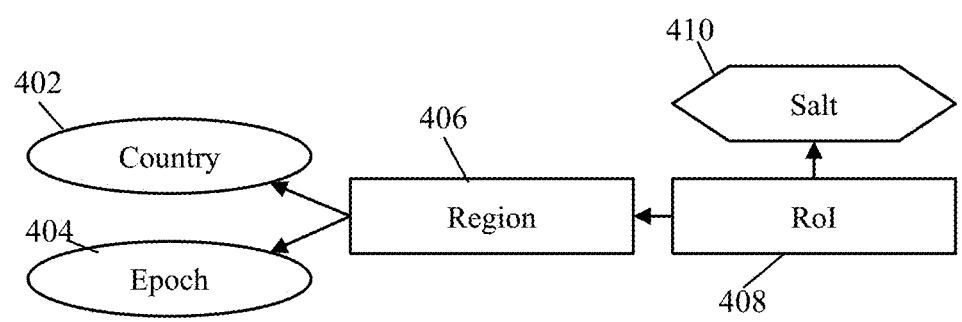
FIGS. 4-12 show a process of machine teaching using a practical geology example in an embodiment.

FIG. 4 shows knowledge base evolution in an embodiment. For instance, this figure illustrates examples and/or example processing of component 202 and 204 shown in FIG. 2. An image of a region, for example, a geological image, can be presented to a user. The region 402 is associated with context 404, 406, for example, the country where the region is located and epoch or geologic epoch regarding the region 402. The region 402 can be designated as a region of interest (RoI) 408 and annotated with a label 410, in this example, as "salt". The label 410, for example, is considered a complex label. A user such as a domain expert may annotate the region or region of interest with a label. There can be one or more databases or knowledge bases, which can store images of regions, region of interest, and metadata about those regions, for example, their context.

Figure 5:
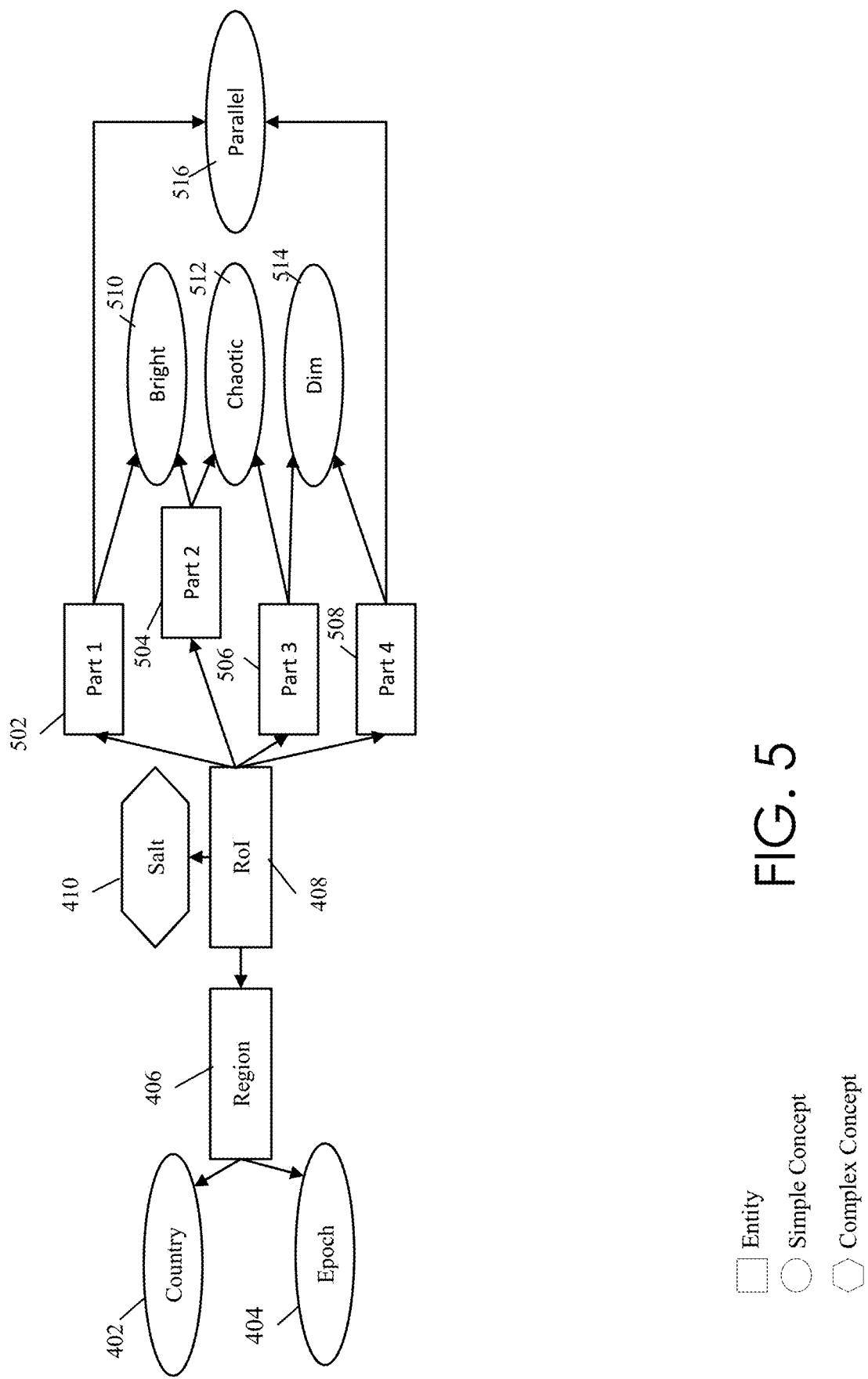

FIG. 5 shows a continuation of knowledge base evolution in an embodiment. For example, a processing component, for example, a computer vision component shown at 206 in FIG. 2 can break or decompose the image of the region of interest into parts 502, 504, 506, 508, and classify the parts into simpler concepts, 510, 512, 514, 516 for example, as shown in FIG. 2 at 214. For example, the region of interest can be broken into several parts having image pattern characteristics, e.g., "chaotic", "bright", "dim", etc. In an embodiment, an automated machine learning model, for example, trained to label characteristics of images, can be used to label the parts with simple concepts. The simple concepts relative locations can also be classified using an automated machine learning model, for example, one part is "parallel" to another part.

Figure 6:
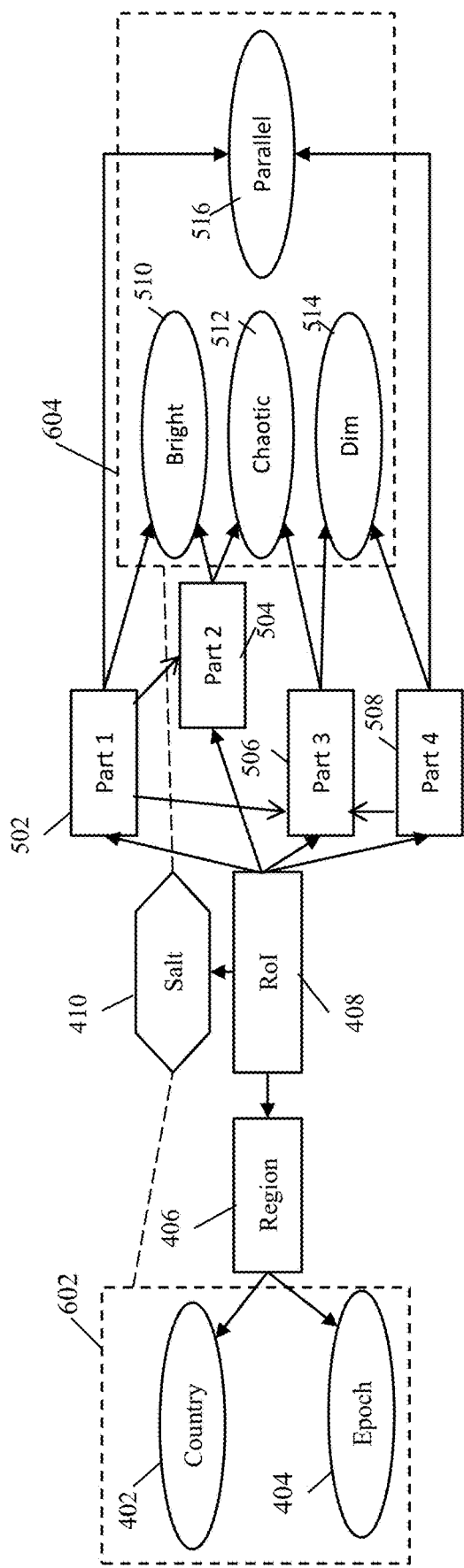

FIG. 6 shows further continuation of knowledge base evolution in an embodiment. For example, a processing component, for example, a knowledge inference component shown at 208 in FIG. 2 can create relationships between concepts and context and store them in a knowledge base (e.g., shown in FIG. 2 at 210). For example, the dashed lines and boxes 602, 604 show relationships created between complex concept "salt" 410, simple concepts "bright" 510, "chaotic" 512, "dim" 514, "parallel" 516 and context 402, 404. For example, the processing component can create relationships between the parts, their concepts, and the geological context, expanding the knowledge base, e.g., "bright on top of chaotic in Netherlands Basin." In an embodiment, a domain specific ontology, which can provide information about the particular domain, can be used to infer that "on top of" translates to "younger than", for example, in geological context. For example, it may be inferred that "Part 1" 502 is "younger than" "Part2" 504 and "Part3" 506, and that "Part4" 508 is "younger than" "Part3" 506. The inferred knowledge about the concept (e.g., user provided complex concept), its parts (e.g., parts that show simple concepts that are characteristics of complex concept), e.g., their characteristics and relationships, can be stored in a knowledge base, e.g., such as one shown at 210 in FIG. 2.

Figure 7:
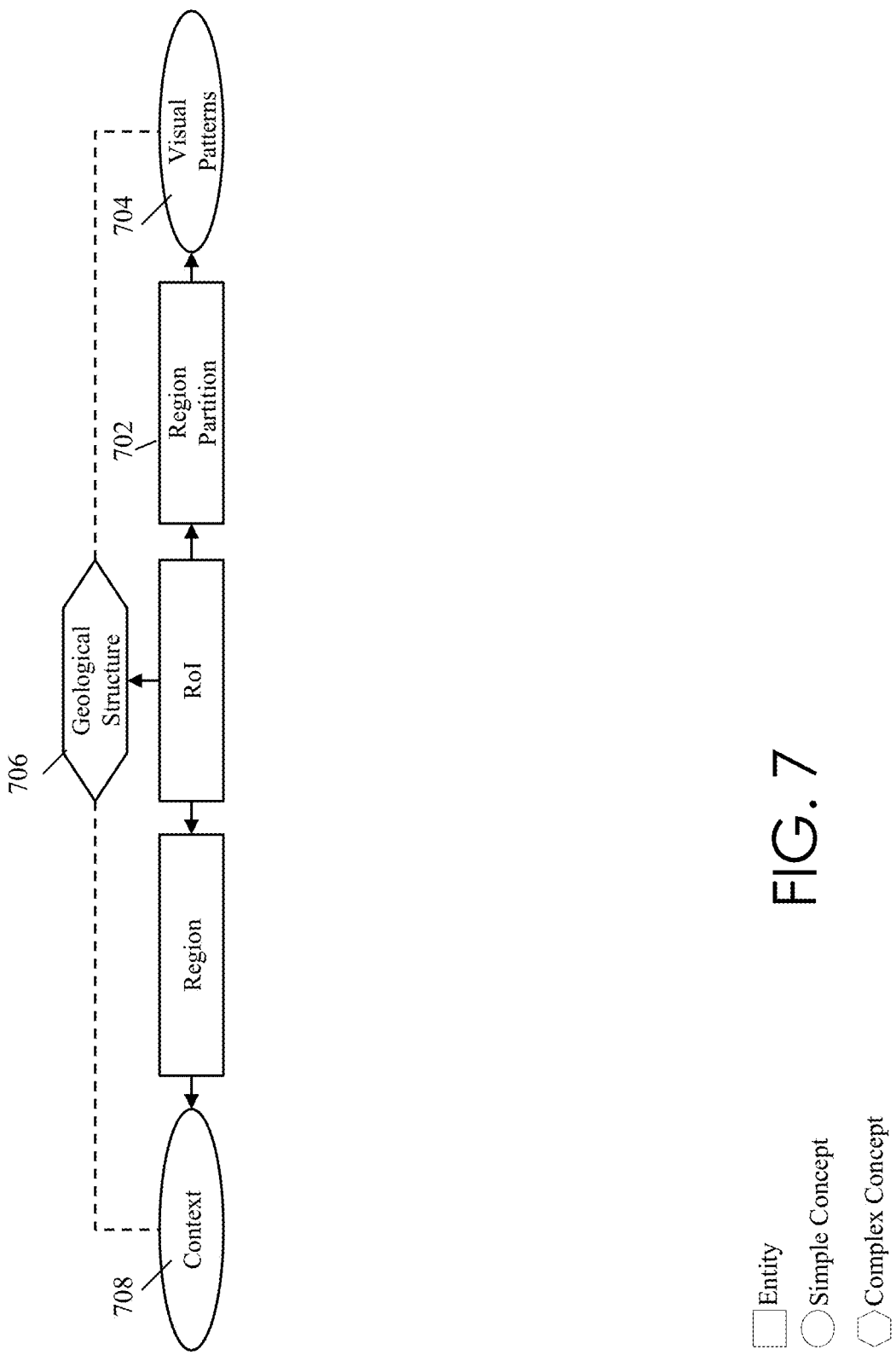

FIG. 7 further shows the knowledge base evolution in an embodiment. For instance, based on processing performed via reference items 202, 204, 214, 212 and 210 shown in FIG. 2 (or a processor performing like processing), knowledge can be learned of a concept, for example, a geological structure in this example. For instance, parts of the region of interest 702 and their visual patterns 704 can be associated with a geological structure 706 (e.g., "salt") and context 708.

Figure 8:
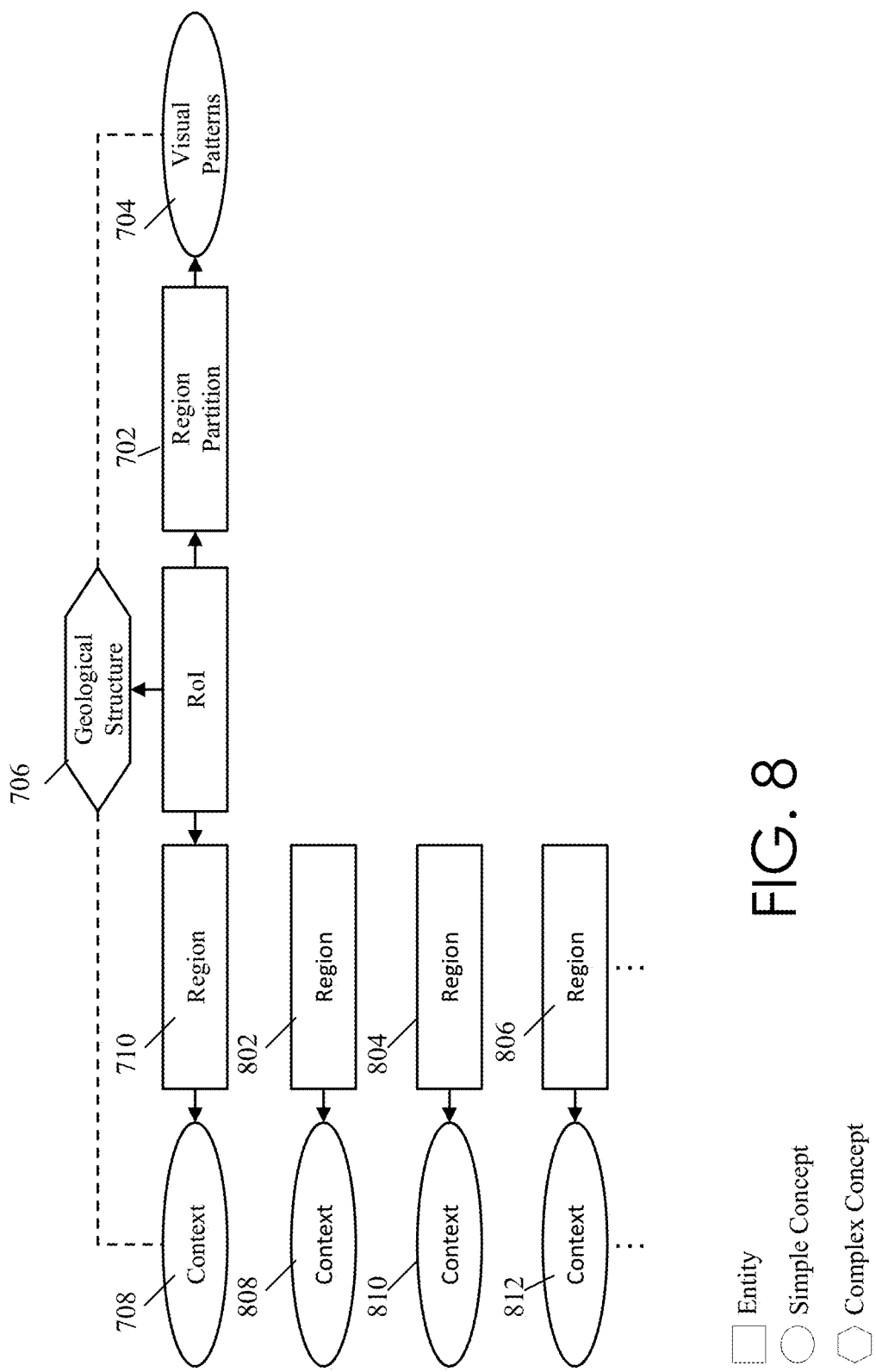
Figure 9:
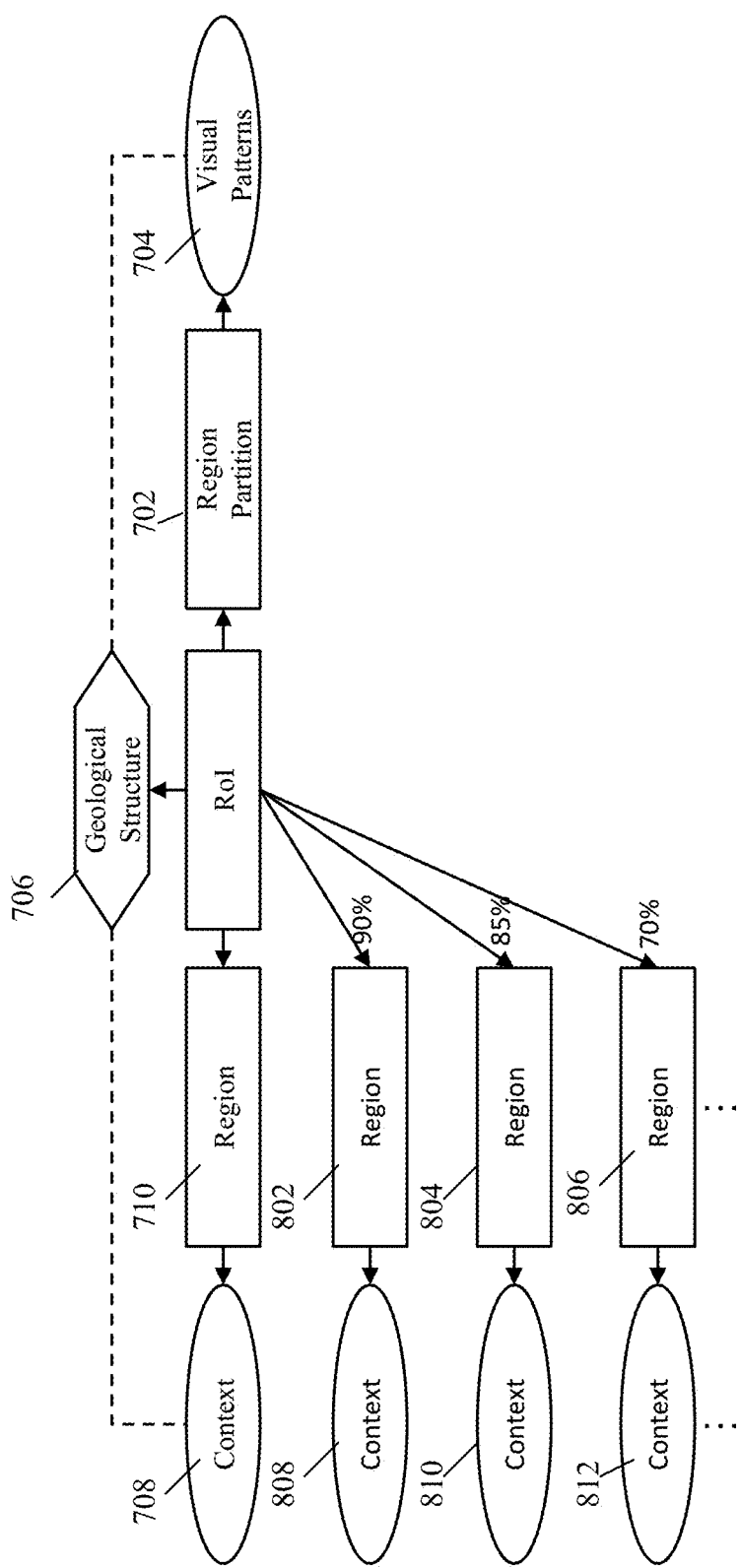

FIG. 8 illustrates a knowledge transfer processing in an embodiment. For instance, given that knowledge is learned of the geological structure as shown in FIG. 7, the learned knowledge can be used to process other images automatically. For instance, a processor may scan the image sets searching for similar images with approximately the same set of simple concepts and relationships and automatically or autonomously label them with the complex concepts. Referring to FIG. 8, images of different regions 802, 804, 806 can be retrieved, for example, each having context 808, 810, 812. In an embodiment, the context is the same or substantially same as the context 708 associated with learned geological structure. For instance, a processor or a computer vision processing (e.g., shown in FIG. 2 at 216) may retrieve similar images. Whether an image (e.g., 802, 804, 806) is similar to that of the image 710 having the learned knowledge, can be determined or processed using one or more image analysis or machine learning algorithms or models, which can classify images. FIG. 9 shows examples of regions determined to have different degrees of similarity in an embodiment. For instance, the region at 802 may have 90% similarity to the region of interest associated with the region at 710; the region at 804 may have 85% similarity to the region of interest associated with the region at 710; the region at 806 may have 70% similarity to the region of interest associated with the region at 710.

Figure 10:
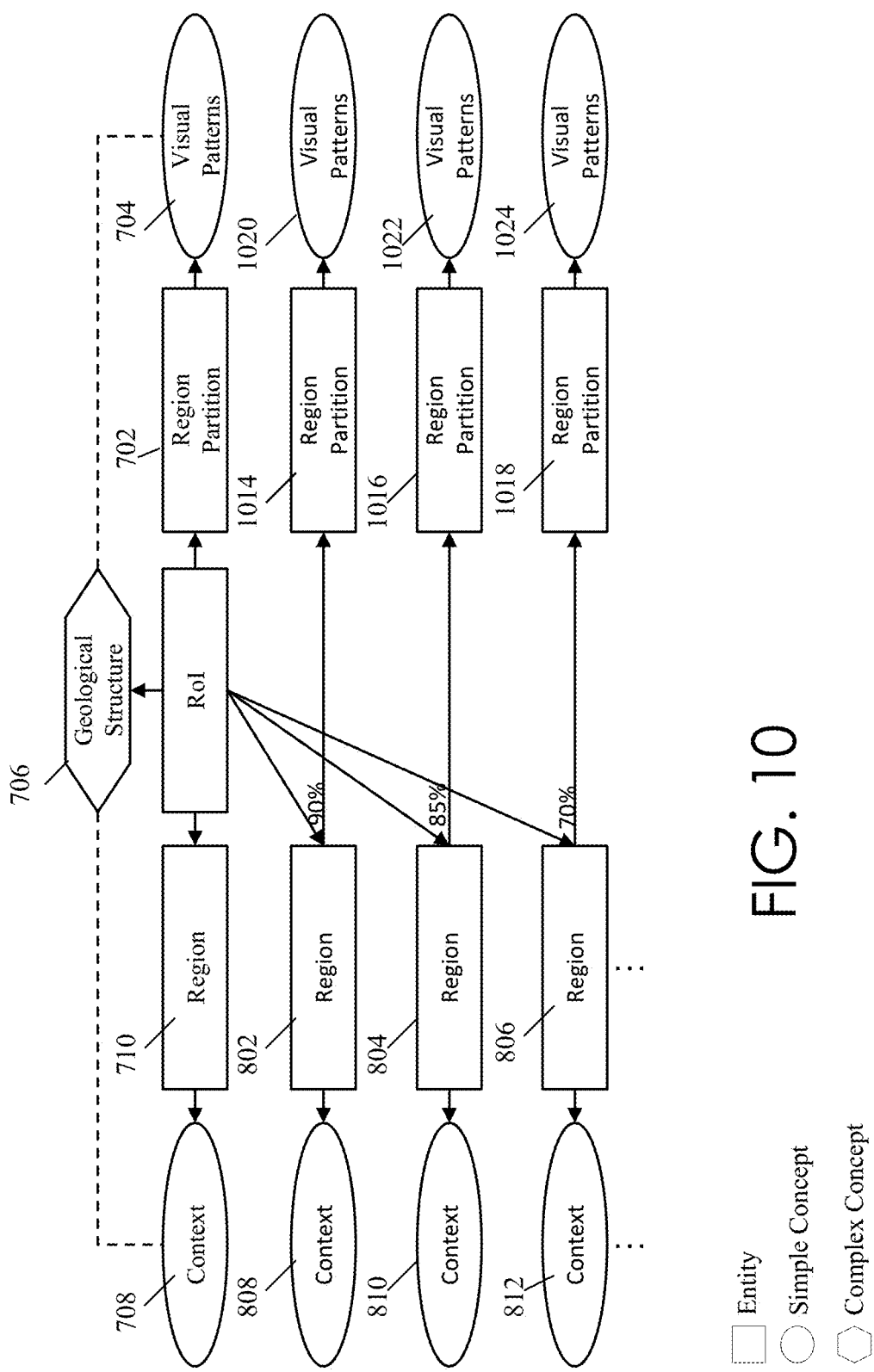

FIG. 10 shows further example of knowledge transfer in an embodiment. For instance, a processor or a computer vision processing (e.g., shown in FIG. 2 at 218) may break each of those similar regions into its parts 1014, 1016, 1018, for example, constituent parts, and classify them with concepts, for example, simple concepts. In an embodiment, visual patterns 1020, 1022, 1024, for example, relationships of simple concepts, associated with each similar region can be obtained.

Figure 11:
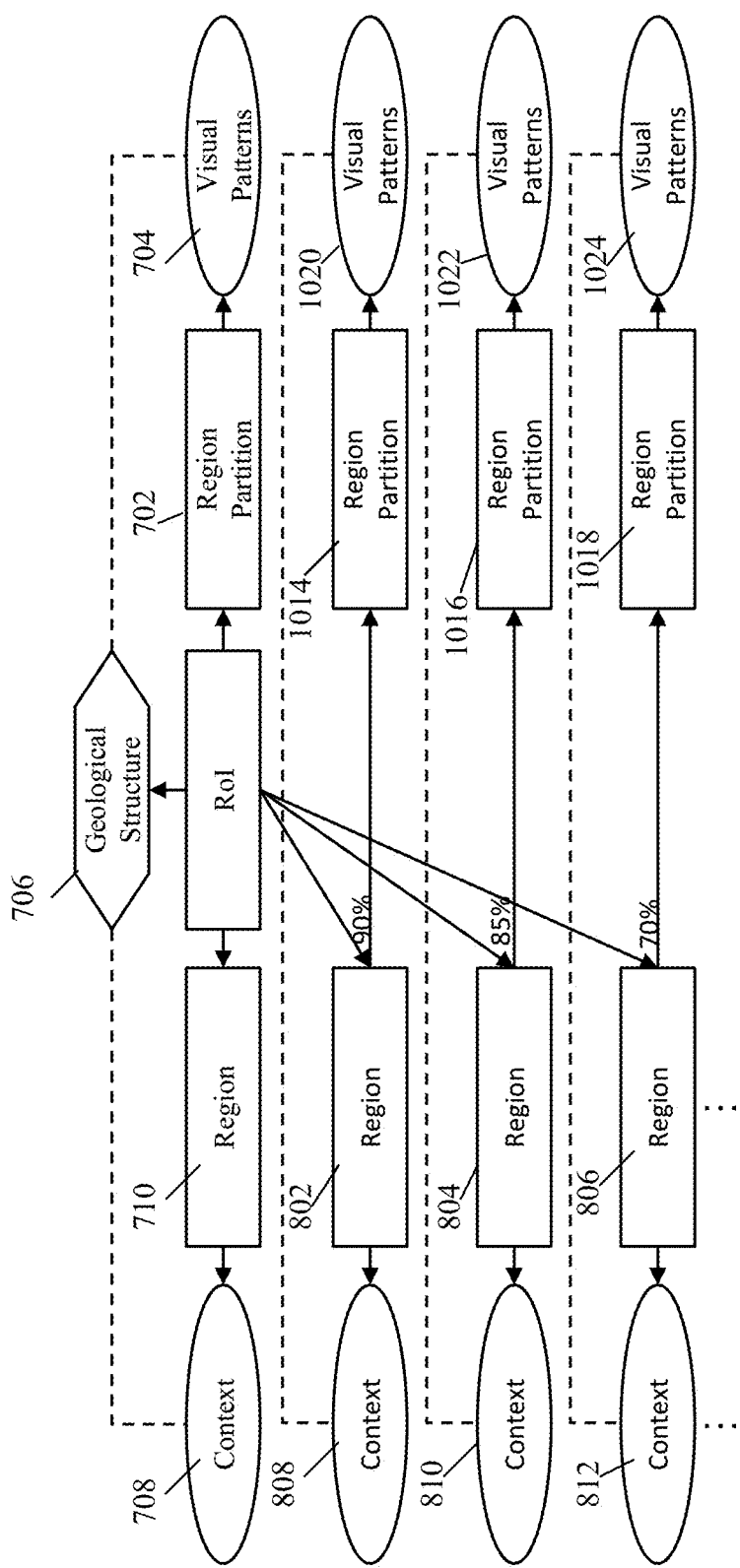

FIG. 11 shows further example of knowledge transfer in an embodiment. Each of the set of relationships 1020, 1022, 1024 of similar regions can be compared with that of the known relationships 704. For instance, a processor or a knowledge inference processing (e.g., shown in FIG. 2 at 220) may compare the relationships 1020 considering context 808 for region 802, with those at 704. Similarly, a processor or a knowledge inference processing (e.g., shown in FIG. 2 at 220) may compare the relationships 1022 considering context 810 for region 804, with those at 704. Likewise, a processor or a knowledge inference processing (e.g., shown in FIG. 2 at 220) may compare the relationships 1024 considering context 812 for region 806, with those at 704.

Figure 12:
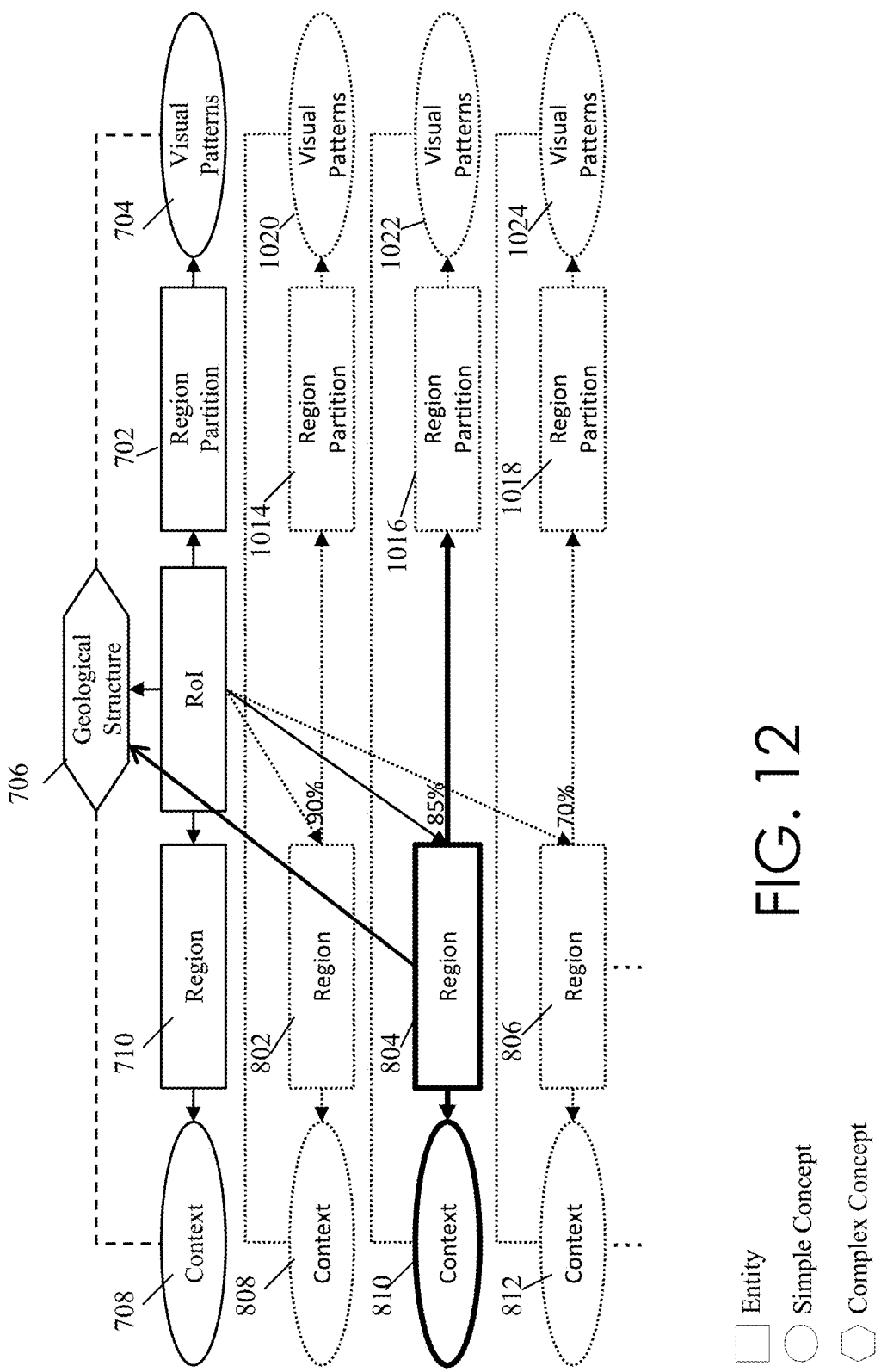

Based on the comparison, one or more of those regions 802, 804, 806 can be labeled automatically with the label 706 of region 710. For example, the comparison can use a threshold, which can be predefined or configured, to determine whether the parts (e.g., 1014, 1016, 1018) and their relationships (e.g., 1020, 1022, 1024, respectively) are similar to the parts 702 and relationships 704 associated with the region 710, which is labeled with a concept or structure name at 706. FIG. 12 shows an example region, determined to be similar to that of 710. For example, a processor or a knowledge inference processing (e.g., shown in FIG. 2 at 222) may infer based on the determined similarity between the region 710 and the region 804 (e.g., their context, parts and relationship of the parts), to label the region 804 with the label 706 given to the region 710. The similar region 804 is annotated with geological structure 706 and can be saved or stored in a knowledge base (e.g., shown at 224 and 210 in FIG. 2).

While the above example described the methodology with an example of annotating geological structure image, the methodology (e.g., systems, methods and/or techniques) described herein can be applicable to any other domain, for example, a medical domain, where medical images can be annotated, and/or other domains. The methodology disclosed herein provides an advantage of being able to dynamically evolve labeling process for machine learning, for example, allowing automated machine learning to be able to update itself, for instance, without using a large amount of training data.

Figure 13:
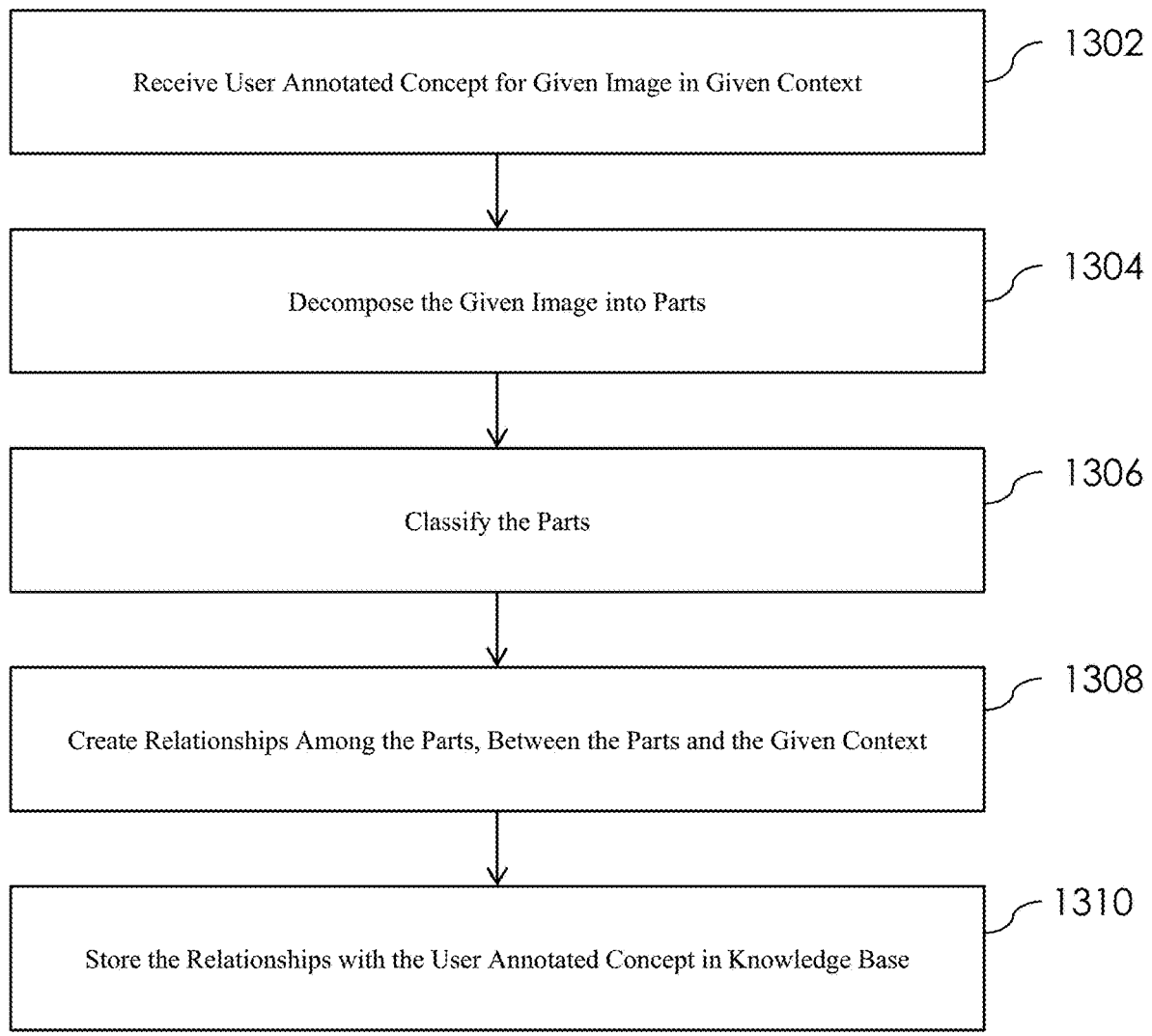
FIG. 13 shows a method of machine teaching to allow a machine to learn a label for a given image in an embodiment.

FIG. 13 shows a method of machine teaching to allow a machine to learn a label for a given image in an embodiment. The method can be performed by one or more computer processors, for example, including one or more hardware processors. At 1302, a user annotated concept for a given image in given context can be received.

At 1304, the given image can be decomposed or into parts. For instance, one or more unsupervised machine learning and/or clustering techniques can be used to decompose or segment the image into parts.

At 1306, the parts can be classified. For example, the parts can be classified into classifications or labeled, for example, to include concepts associated with those parts. By way of example, a machine learning model trained to classify images can be used to label the parts with concepts. For instance, a processor may train a classifier or like machine learning algorithm (e.g., Convolutional Neural Network (CNN)) to classify these images (parts associated with simpler concepts). In an aspect, training a machine learning model to recognize or classify simpler concepts may take less computing resources than training a machine learning model to recognize or classify a complex concept.

At 1308, relationships can be created among the parts and between the parts. Relationships can also be created between the parts and the given context, for example, domain area. In an embodiment, image analysis techniques, for example, using ontologies, may be used to create relationships among the parts.

At 1310, the created relationships can be stored with the user annotated concept in a knowledge base. For instance, the information about the given image, its label annotated by a user, its decomposed and classified parts, the created or identified relationships among the parts (e.g., between one part and another part), and also with the given context, can be stored in a knowledge base, for example, on a storage device.

In an embodiment, decomposing the image into parts can be performed by running computer vision. In an embodiment, classifying of the parts can be performed by a machine learning model trained to classify images. In an embodiment, unsupervised machine learning can partition or segment the given image into parts.

Figure 14:
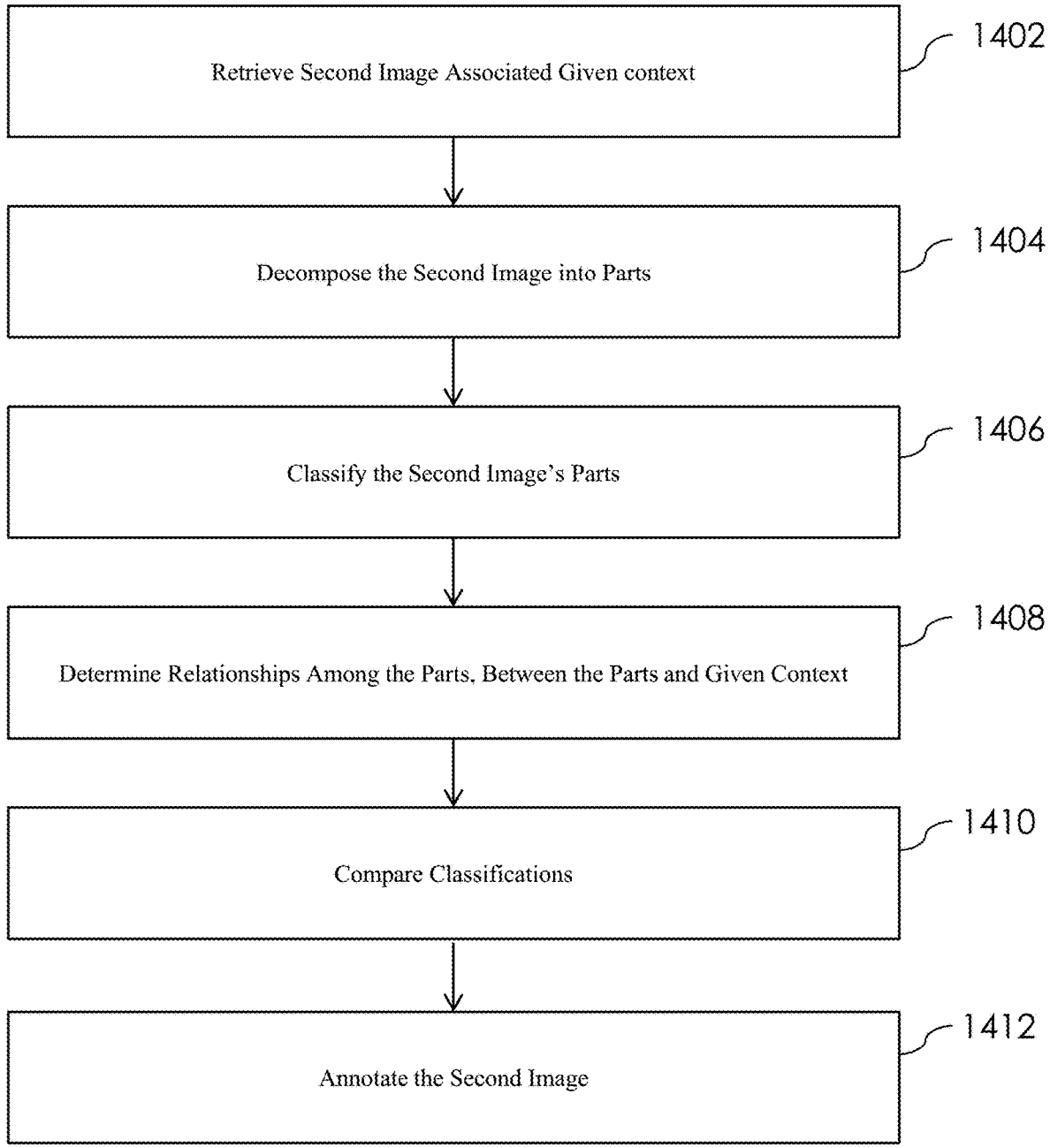
FIG. 14 shows a method of autonomously labeling an image in an embodiment.

The method can also include using the created and stored information of the knowledge base. For example, FIG. 14 is a flow diagram illustrating a method in an embodiment. At 1402, second image associated with given context is retrieved. One or more second images can be retrieved, and the method performed on each image. This second image, for instance, can be a similar image to an image that is annotated by a user, for example, described above with reference to 1302 in FIG. 13. Similarity between images can be determined based on a threshold value. For example, in an embodiment, a machine learning technique such as, but not limited to, Convolutional Neural Network (CNN) can classify and select similar images.

At 1404, the second image is decomposed into parts. For example, similar technique or techniques described above with reference to 1304 in FIG. 13 can be used to perform this decomposition or partition of the second image. For instance, one or more unsupervised machine learning and/or clustering techniques can be used to segment the second image into parts.

At 1406, the second image's parts are classified. For example, similar technique or techniques described above, for example, with reference to 1306 in FIG. 13 can be used to perform this classification. For example, a machine learning model trained to classify images can be used to label the parts with concepts.

At 1408, relationships can be determined among the second image's parts and between the second image's parts and the given context. Relationships can be determined, for example, as described herein, for example, using image analysis techniques and, for example, using ontologies or like knowledge base.

At 1410, classifications of the second image's parts, the relationships among the second image's parts and between the second image's parts and the given context, can be compared with classifications of the given image's parts, the relationships among the given image's parts and between the given image's parts and the given context.

At 1412, based on the comparing, the second image can be annotated with the user annotated concept for the image, for example, whose information has been created and stored in a knowledge base according to the method described with reference to FIG. 13. For example, the second image can be annotated with another image's annotation, which was given by a user, responsive to determining that relationships of parts associated with that another image and the determined relationships of parts associated with the second image are similar based on a similarity threshold.

In an embodiment, the second image's relationships and the annotated concept can be stored in a knowledge base on a storage device. In an embodiment, the annotation can be validated with a user, and storing the second image with the annotation can be done responsive to the user's validation. In an embodiment, thus built knowledge base can be used to train a machine learning model to learn to identify concepts in images autonomously.

In an embodiment, the context can be geology. In another embodiment, the context can be medical imaging. There can be other contexts.

In an embodiment of a system and/or method, as experts provide annotations, those concepts and relationships between the concepts can be stored in the knowledge base which is, therefore, able to evolve. For instance, in an embodiment, domain experts or users may provide the concepts to a given context which might not be automatically discovered using templates. In an embodiment, computer vision can be used (i) to automatically find contexts similar to the original one and (ii) to transfer the knowledge about the most appropriated concepts to annotate such context based on the annotations provided by the expert to the original one.

In an embodiment, a system and/or method can allow one to deal with knowledge bases that evolve over time since domain concepts may not be known beforehand. The system and/or method can also transfer the concepts learned in a context to other contexts. In an embodiment, a system and/or method can make use of visual information and computer vision to create hidden relationships between given concepts.

In an embodiment, a system and/or method may use a small group or relatively small group of annotated labels and use regular interpretation activities to allow the system to learn and expand a knowledge base. In an embodiment, a system and/or method may extract knowledge from annotations created by multiple experts through dynamic interpretation activities. In an embodiment, a system and/or method can expand the knowledge base through complementary data extracted with computer vision techniques. In an embodiment, a system and/or method can transfer knowledge from different annotation contexts, for example, using such techniques.

In an embodiment, a system and/or method may use a knowledge base to enhance an image recognition model, and expand a knowledge base's hierarchical knowledge based on data artifacts generated during domain expert's work. In an embodiment, a system and/or method can use a symbolic knowledge base which can be automatically expanded and used to increase the computer vision algorithm accuracy without explicitly adding new labeled data. In an embodiment, a system and/or method can consume a knowledge base to correctly detect concepts in the input and include a process to expand the knowledge base.

In an embodiment, a system and/or method may break a high-level geological concept associated with a region of interest into smaller regions and associate them with basic concepts. In an embodiment, a system and/or method can detect patterns associated with multimedia content, such as seismic surveys and their corresponding representations. For instance, in this way, the system can expand the original concept to other areas, automatically labeling large amounts of data (e.g., machine teaching). For instance, in an embodiment, a system and/or method can include automatic, general-purpose labeling. In an embodiment, a system and/or method can use a knowledge base to capture and reuse the information provided by the user in past interactions.

In an embodiment, a system and/or method can provide a generalized tool, allowing its users to teach any complex concept, e.g., complex geological concept (concepts composed of sub-concepts) to the system. In an embodiment, a system and/or method can employ an interactive and iterative workflow that enables its users to continually teach new concepts and expand the system's knowledge using a knowledge base. In an embodiment, a system and/or method can store and reason on the information in the knowledge base, which enables the system and/or method to become more knowledgeable with time.

In an embodiment, a system and/or method can use and/or expand a symbolic knowledge base that can be used to enrich statistical models being generated. For example, in an embodiment, a system and/or method can leverage the use of both statistical-based computer vision algorithms and the domain knowledge automatically extracted from the domain experts.

In an embodiment, a system and/or method can provide a knowledge base that can store concepts used to annotate context and evolve, for instance, whenever new concepts and relationships between them appear. In an embodiment, a system and/or method can provide machine teaching techniques to transfer the knowledge to context to another similar context. In an embodiment, a system and/or method can automatically expand a knowledge base for teaching computer vision algorithms.

Figure 15:
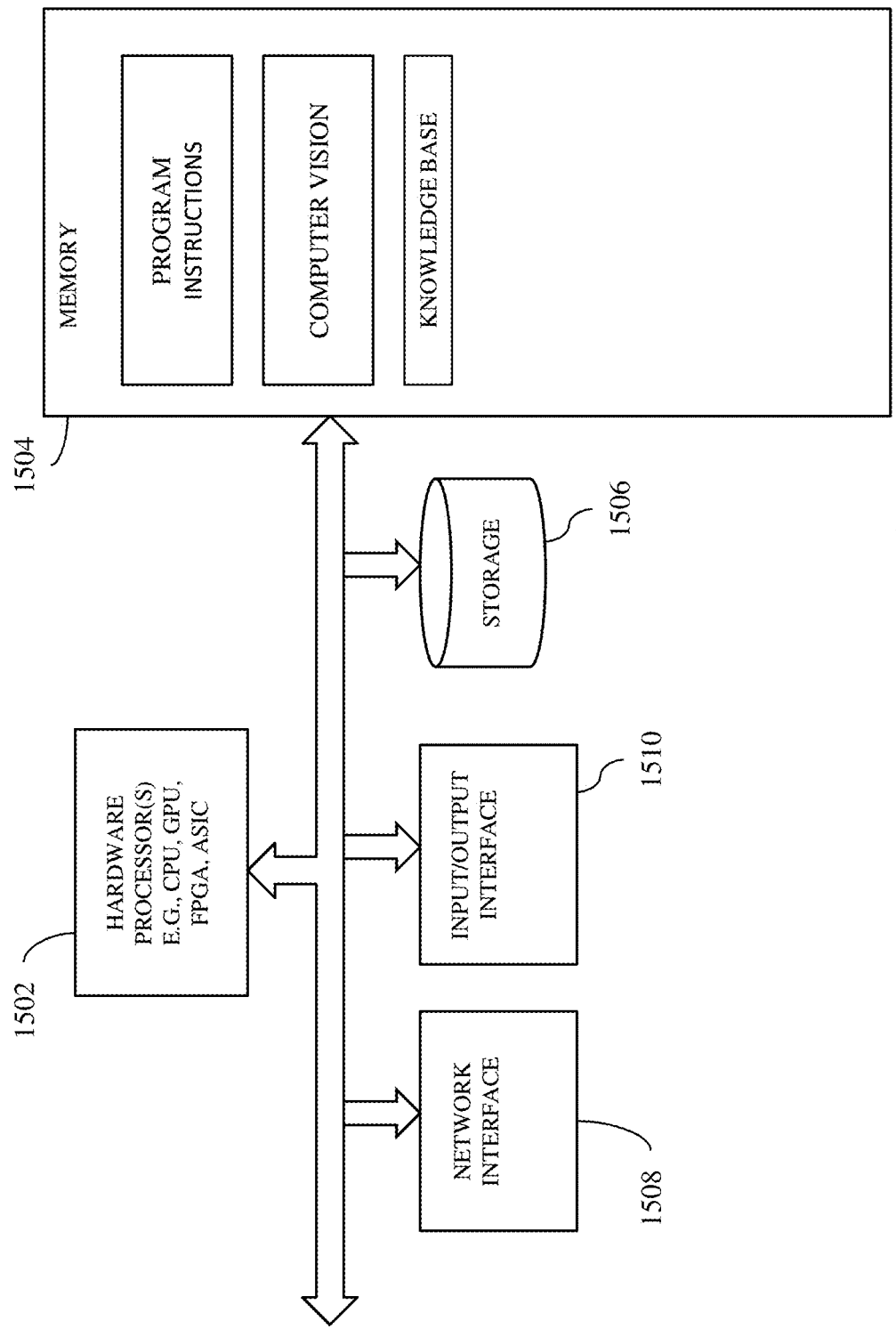
FIG. 15 is a diagram showing components of a system in one embodiment that can perform machine teaching for learning concepts associated with images.

FIG. 15 is a diagram showing components of a system in one embodiment that can perform machine teaching, for example, as disclosed here. One or more hardware processors 1502 such as a central processing unit (CPU), a graphic process unit (GPU), and/or a Field Programmable Gate Array (FPGA), an application specific integrated circuit (ASIC), and/or another processor, may be coupled with a memory device 1504, and perform machine teaching, for example, using computer vision and knowledge base techniques, as disclosed herein. A memory device 1504 may include random access memory (RAM), read-only memory (ROM) or another memory device, and may store data and/or processor instructions for implementing various functionalities associated with the methods and/or systems described herein. One or more processors 1502 may execute computer instructions stored in memory 1504 or received from another computer device or medium. A memory device 1504 may, for example, store instructions and/or data for functioning of one or more hardware processors 1502, and may include an operating system and other program of instructions and/or data. One or more hardware processors 1502 may receive input including images, for example, which can be digital images, decompose into parts and classify the parts. One or more hardware processors 1502 may create or identify relationships among the parts and store the relationships. One or more hardware processors 1502 may employ computer vision and knowledge base techniques. One or more hardware processors 1502 may automatically or autonomously identify or label other images, for example, in similar context, using the stored relationships. In an aspect, images and/or knowledge base data may be stored in a storage device 1506 or received via a network interface 1508 from a remote device, and may be temporarily loaded into a memory device 1504 for performing machine teaching and/or machine learning. One or more hardware processors 1502 may be coupled with interface devices such as a network interface 1508 for communicating with remote systems, for example, via a network, and an input/output interface 1510 for communicating with input and/or output devices such as a keyboard, mouse, display, and/or others.

Figure 16:
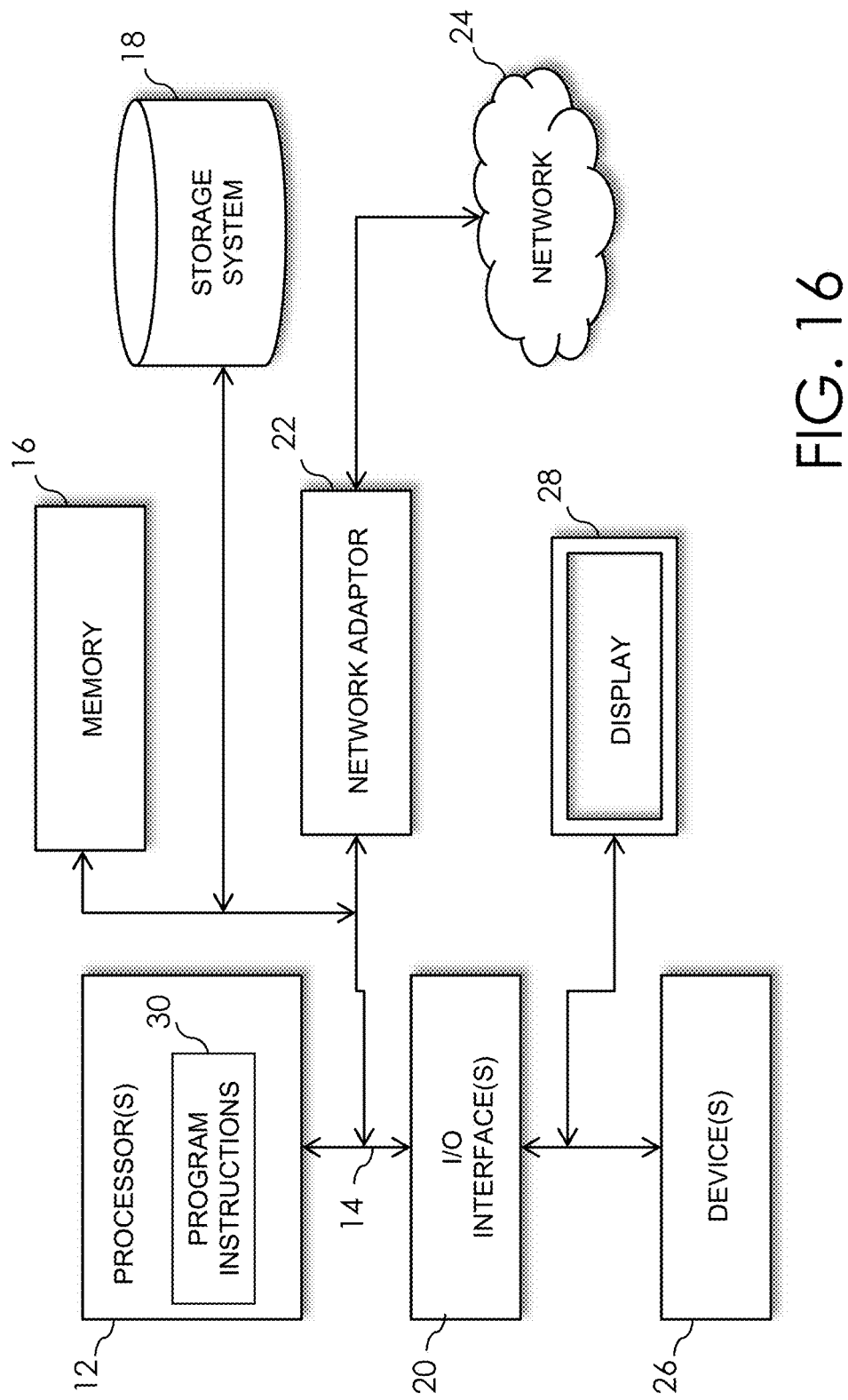
FIG. 16 illustrates a schematic of an example computer or processing system that may implement a system according to one embodiment.

FIG. 16 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 16 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 17:
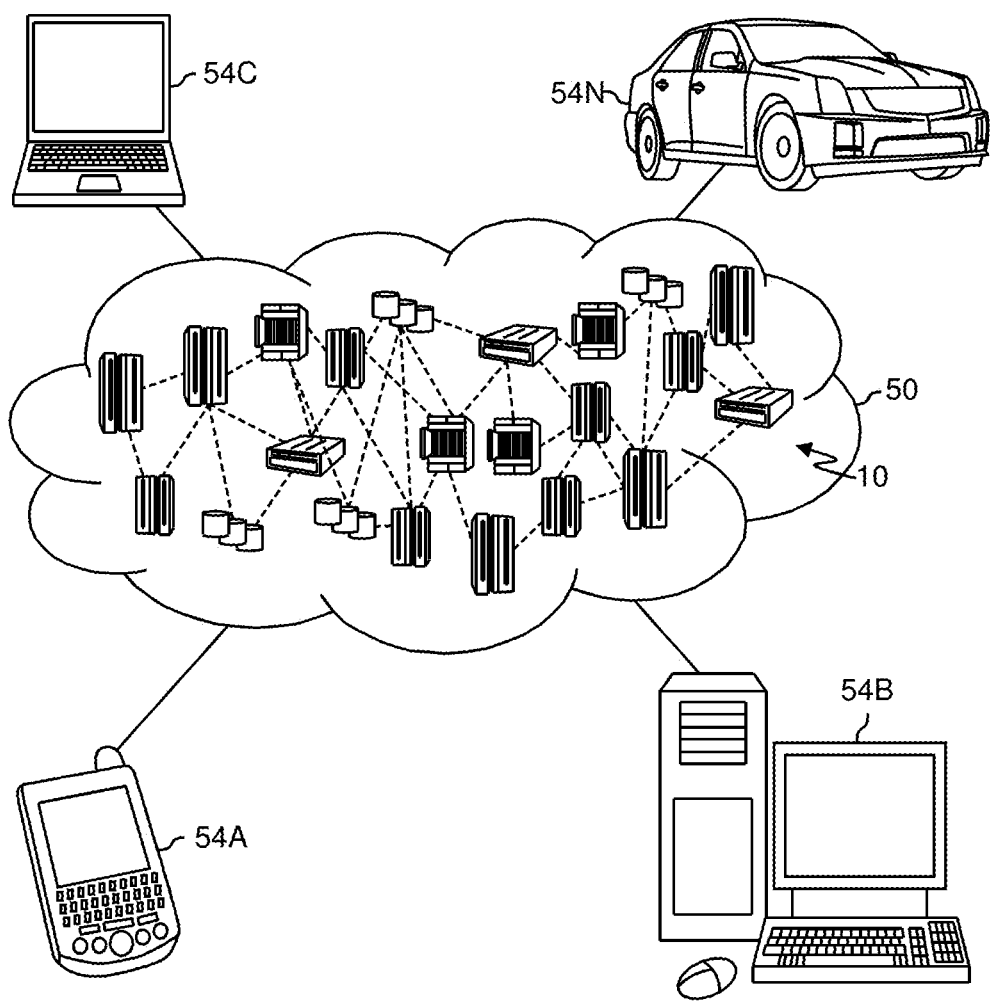
FIG. 17 illustrates a cloud computing environment in one embodiment.

Referring now to FIG. 17, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 17 are intended to be illustrative only and that computing nodes 10 and cloud computing environment 50 can communicate with any type of computerized device over any type of network and/or network addressable connection (e.g., using a web browser).

Figure 18:
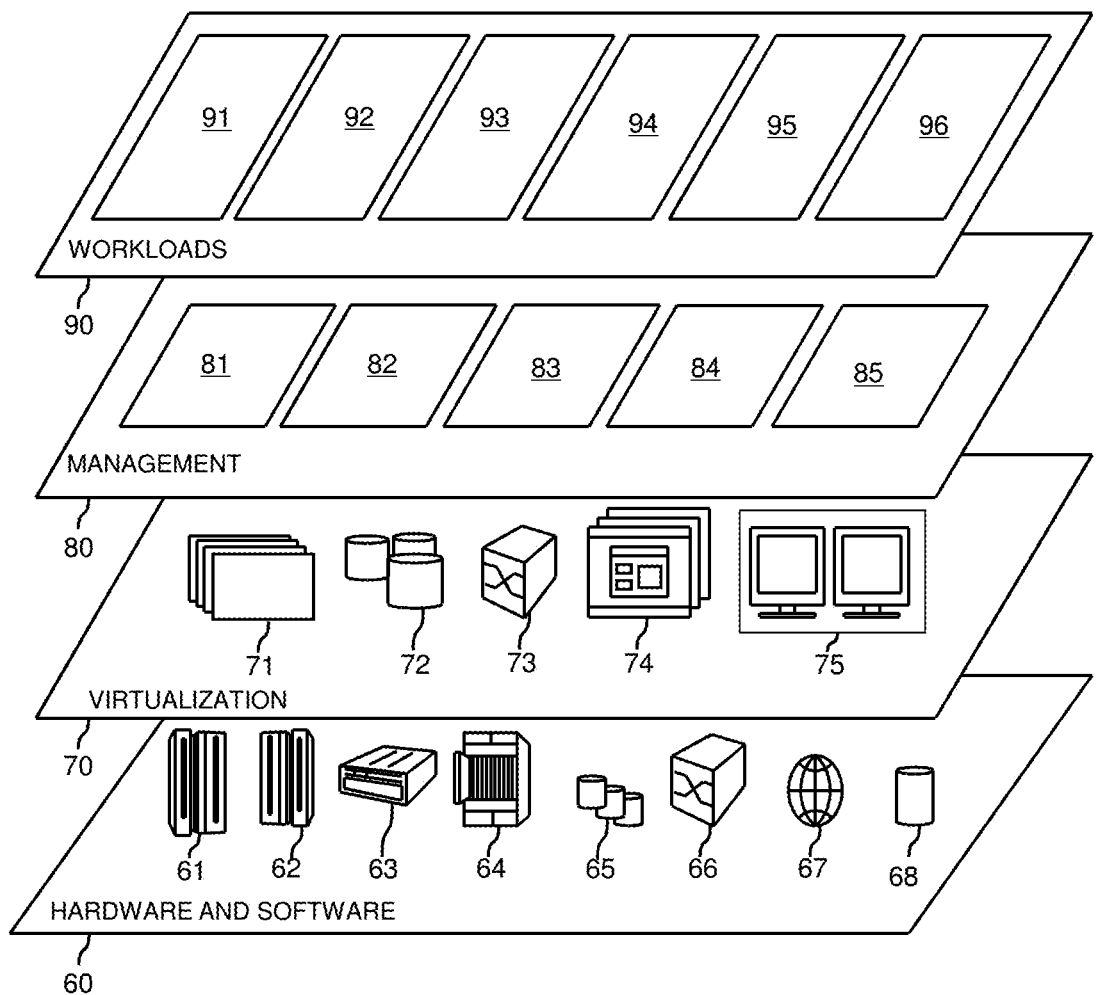
FIG. 18 illustrates a set of functional abstraction layers provided by cloud computing environment in one embodiment of the present disclosure.

Referring now to FIG. 18, a set of functional abstraction layers provided by cloud computing environment 50 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine teaching processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   receiving a user annotated concept for a given image in given context;
   decomposing the given image into parts;
   classifying the parts;
   creating relationships among the parts and between the parts and the given context;
   storing at least the relationships with the user annotated concept in a knowledge base;
   retrieving a second image associated the given context;
   decomposing the second image into parts;
   classifying the second image's parts;
   determining relationships among the second image's parts and between the second image's parts and the given context;
   comparing classifications of the second image's parts, the relationships among the second image's parts and between the second image's parts and the given context, with classifications of the given image's parts, the relationships among the given image's parts and between the given image's parts and the given context; and
   based on the comparing and responsive to determining that the created relationships associated with the given image and the determined relationships associated with the second image are similar based on a similarity threshold, annotating the second image with the user annotated concept for the given image.

2. The method of claim 1, wherein the decomposing is performed by computer vision.

3. The method of claim 1, wherein the classifying is performed by a machine learning model trained to classify images.

4. The method of claim 1, wherein unsupervised machine learning partitions the given image into parts.

5. The method of claim 1, wherein the second image is retrieved based on similarity with the given image, the similarity determined according to a similarity threshold.

6. The method of claim 1, further including storing at least the second image's relationships with the user annotated concept for the given image in the knowledge base.

7. The method of claim 6, wherein the knowledge base is used to train a machine learning model to learn to identify concepts in images autonomously.

8. The method of claim 1, further including validating with a user whether the second image is to be annotated with the user annotated concept for the given image, and storing at least the second image's relationships with the user annotated concept for the given image in the knowledge base responsive to the user's validation.

9. The method of claim 1, wherein the given context includes geology.

10. The method of claim 1, wherein the given context includes medical imaging.

11. A computer program product comprising a computer readable storage medium having program instructions embodied therewith, the program instructions readable by a device to cause the device to:
    receive a user annotated concept for a given image in given context;
    decompose the given image into parts;
    classify the parts;
    create relationships among the parts in the given image and between the parts in the given image and the given context; and
    store at least the relationships with the user annotated concept in a knowledge base.

12. The computer program product of claim 11, wherein the device is caused to run computer vision to decompose the given image into parts.

13. The computer program product of claim 11, wherein the device is caused to run a machine learning model to classify the parts.

14. The computer program product of claim 11, wherein the device is caused to run unsupervised machine learning to decompose the given image into parts.

15. The computer program product of claim 11, the device is further caused to:
    retrieve a second image associated the given context;
    decompose the second image into parts;
    classify the second image's parts;
    determine relationships among the second image's parts and between the second image's parts and the given context;
    compare classifications of the second image's parts, the relationships among the second image's parts and between the second image's parts and the given context, with classifications of the given image's parts, the relationships among the given image's parts and between the given image's parts and the given context; and
    based on comparing, annotate the second image with the user annotated concept for the given image.

16. The computer product of claim 15, wherein the second image is annotated with the user annotated concept for the given image responsive to determining that the created relationships associated with the given image and the determined relationships associated with the second image are similar based on a similarity threshold.

17. A system comprising:
    a hardware processor; and
    a storage device;
    the hardware processor configured to at least:
      receive a user annotated concept for a given image in given context;
      decompose the given image into parts;
      classify the parts;
      create relationships among the parts in the given image and between the parts in the given image and the given context; and
      store at least the relationships with the user annotated concept in a knowledge base on the storage device.

18. The system of claim 17, wherein the hardware processor is further configured to:
    retrieve a second image associated the given context;
    decompose the second image into parts;
    classify the second image's parts;
    determine relationships among the second image's parts and between the second image's parts and the given context;

compare classifications of the second image's parts, the relationships among the second image's parts and between the second image's parts and the given context, with classifications of the given image's parts, the relationships among the given image's parts and between the given image's parts and the given context; and based on comparing, annotate the second image with the user annotated concept for the given image.

19. The system of claim 18, wherein the second image is annotated with the user annotated concept for the given image responsive to determining that the created relationships associated with the given image and the determined relationships associated with the second image are similar based on a similarity threshold.

* * * * *